US012808813B2

(12) United States Patent
Hirano et al.

(10) Patent No.: US 12,808,813 B2
(45) Date of Patent: Nov. 24, 2026

(54) PATTERN INSPECTION APPARATUS AND PATTERN INSPECTION METHOD

(71) Applicant: NuFlare Technology, Inc., Yokohama (JP)

(72) Inventors: Ryoichi Hirano, Setagaya-ku (JP); Toshiaki Otaki, Yokohama (JP); Hiroyuki Nagahama, Niiza (JP); Yasuhiro Yamashita, Chigasaki (JP)

(73) Assignee: NuFlare Technology, Inc., Yokohama (JP)

( * ) Notice: Subject to any disclaimer, the term of this patent is extended or adjusted under 35 U.S.C. 154(b) by 0 days.

(21) Appl. No.: 19/273,667

(22) Filed: Jul. 18, 2025

(65) Prior Publication Data

US 2026/0049945 A1 Feb. 19, 2026

(30) Foreign Application Priority Data

Aug. 13, 2024 (JP) ................................. 2024-135118

(51) Int. Cl.
*G01N 21/88* (2006.01)
*G01N 21/956* (2006.01)
(Continued)

(52) U.S. Cl.
CPC ..... *G01N 21/8806* (2013.01); *G01N 21/8851* (2013.01); *G01N 21/956* (2013.01);
(Continued)

(58) Field of Classification Search
CPC ........... G01N 21/8806; G01N 21/8851; G01N 21/956; G01N 2021/95676; G01N 21/01;
(Continued)

(56) References Cited

U.S. PATENT DOCUMENTS 5,136,149 A 8/1992 Fujiwara et al.
5,838,433 A 11/1998 Hagiwara
6,927,847 B2 * 8/2005 Yoshida ........... G01N 21/95684 356/237.4
(Continued)

FOREIGN PATENT DOCUMENTS

JP 9-1 45626 A 6/1997
JP 2009-223095 A 10/2009
(Continued)

*Primary Examiner* — Michael Lee
(74) *Attorney, Agent, or Firm* — Oblon, McClelland, Maier & Neustadt, L.L.P.

(57) ABSTRACT

According to one aspect of the present invention, a pattern inspection apparatus includes: a first detection mechanism configured to detect a change in a first positional relationship between a focal position of a first light flux and a first sensor; a second detection mechanism configured to detect a change in a second positional relationship between a focal position of a second light flux and a second sensor; a third detection mechanism configured to detect a change in a third positional relationship between a focal position of a separated third light flux and a focal position of a common detection optical system on a substrate side; and a control circuit configured to control at least two of the first adjustment mechanism, the second adjustment mechanism, and the third adjustment mechanism so as to adjust at least two of the first positional relationship, the second positional relationship, and the third positional relationship.

14 Claims, 14 Drawing Sheets

(51) Int. Cl.
*H04N 23/56* (2023.01)
*H04N 23/67* (2023.01)

(52) U.S. Cl.
CPC ............. *H04N 23/56* (2023.01); *H04N 23/67* (2023.01); *G01N 2021/95676* (2013.01)

(58) Field of Classification Search
CPC ..... G01N 21/95607; G01N 2021/0112; H04N 23/56; H04N 23/67
See application file for complete search history.

(56) References Cited

U.S. PATENT DOCUMENTS

| | | | | |
|---|---|---|---|---|
| 12,579,635 | B2 * | 3/2026 | Hirano | G06T 7/001 |
| 2003/0020904 | A1 * | 1/2003 | Uto | G01N 21/95607 356/237.2 |
| 2004/0262529 | A1 * | 12/2004 | Yoshida | G01N 21/956 250/372 |
| 2005/0062963 | A1 * | 3/2005 | Yoshida | G01N 21/956 356/237.5 |
| 2009/0237909 | A1 | 9/2009 | Ogawa | |
| 2012/0075606 | A1 * | 3/2012 | Nelson | G03F 1/84 356/388 |
| 2016/0028936 | A1 | 1/2016 | Saphier et al. | |
| 2017/0032507 | A1 * | 2/2017 | Otaki | G02B 21/245 |
| 2018/0114306 | A1 * | 4/2018 | Ogawa | G01N 21/956 |
| 2023/0137226 | A1 * | 5/2023 | Takeda | G01N 21/9501 356/237.5 |
| 2026/0049951 | A1 * | 2/2026 | Nagahama | G01N 21/956 |

FOREIGN PATENT DOCUMENTS

| | | | |
|---|---|---|---|
| JP | 2011-53120 | A | 3/2011 |
| JP | 2012-127856 | A | 7/2012 |
| JP | 2016-31535 | A | 3/2016 |
| JP | 2017-90147 | A | 5/2017 |
| JP | 2020-125941 | A | 8/2020 |
| JP | 2026-32501 | A | 2/2026 |

* cited by examiner

PATTERN INSPECTION APPARATUS AND PATTERN INSPECTION METHOD

CROSS-REFERENCE TO RELATED APPLICATION

This application is based upon and claims the benefit of priority from prior Japanese Patent Application No. 2024-135118 filed on Aug. 13, 2024 in Japan, the entire contents of which are incorporated herein by reference.

BACKGROUND OF THE INVENTION

Field of the Invention

Embodiments described herein relate generally to a pattern inspection apparatus and a pattern inspection method. For example, the embodiments described herein relate generally to an apparatus for inspecting pattern defects of an exposure mask used for semiconductor manufacturing and a focal position adjustment method of the apparatus.

Related Art

Recently, with an increase in the degree of integration and an increase in the capacity of a large-scale integrated circuit (LSI), a circuit line width required for semiconductor elements decreases. These semiconductor elements are manufactured by forming circuits by exposing and transferring a pattern onto a wafer by a reduction projection exposure device called a so-called stepper, using an original pattern (also called a mask or reticle; hereinafter collectively referred to as a mask) on which circuit patterns are formed.

Further, improvement of a yield is indispensable for manufacturing the LSI requiring a large manufacturing cost. As one of major factors decreasing the yield, there is a pattern defect of a mask used at the time of exposing and transferring an ultrafine pattern on a semiconductor wafer by photolithography technology. In recent years, with the miniaturization of a dimension of an LSI pattern formed on a semiconductor wafer, a dimension to be detected as a pattern defect is also extremely small. For this reason, it is necessary to improve the accuracy of a pattern inspection apparatus for inspecting a defect of a transfer mask used for manufacturing the LSI.

Examples of an inspection method include "die to die inspection" for comparing optical image data obtained by imaging the same patterns at different locations on the same mask, and "die to database inspection" for inputting write data (design data) converted into an input format for a writing apparatus at the time of writing a pattern of pattern-designed CAD data to a mask to an inspection apparatus, generating a reference image based on the write data, and comparing the reference image with an optical image to be measurement data obtained by imaging the pattern.

In such an inspection apparatus, it is necessary to clearly collect a pattern image on a mask that is an inspection object. However, since there is a finite focal depth in an optical system of the inspection apparatus, it is necessary to keep an inspection plane of the inspection object within the focal depth of the optical system during the inspection. In other words, it is required to maintain the contrast of a captured image within an allowable range. In the inspection apparatus, it is necessary to continuously capture images by scanning the mask while moving a stage, and it is not realistic to sequentially calculate the image contrast during the inspection to adjust a focal point (focus) of the optical system because a processing time is insufficient.

Therefore, in the inspection apparatus, in addition to the inspection optical system for image capturing, an autofocus mechanism that detects displacement in a height direction of the inspection object with respect to the inspection optical system and adjusts the height position is adopted.

With the recent miniaturization of patterns, a wavelength of inspection light decreases. Accordingly, the focal depth of the inspection optical system becomes shallower. For this reason, although the accuracy of a measurement system of the independent autofocus mechanism installed in the vicinity of the inspection optical system is conventionally sufficient, unless the (In-situ) measurement using the inspection optical system itself is performed, various fluctuation factors (dependency of temperature/mechanical deformation) of the inspection optical system cannot be detected, and highly accurate focus adjustment cannot be performed. Therefore, a mode in which the inspection optical system is partially used is adopted as the autofocus mechanism (see Published Unexamined Japanese Patent Application No. 2020-125941 (JP-A-2020-125941), for example).

For example, autofocus is performed by measuring amounts of light having passed through slits disposed before and after a focusing position of an image from the mask and calculating a difference value between both the measured amounts of light to measure a change in the height position of the mask. In the optical system of the autofocus mechanism, ideally, a focal point of a detection optical system that captures an inspection image is adjusted to match an imaging sensor in a state where the focus is adjusted such that the difference value between both the amounts of light becomes zero. However, in a case where different regions on the mask are simultaneously imaged by different imaging sensors, a focal position of one detection optical system does not necessarily coincide with a focal position of the other detection optical system. For this reason, there is a problem that if the focal point is configured to match the focal position of one detection optical system, the focal point is shifted from the focal position of the other detection optical system.

BRIEF SUMMARY OF THE INVENTION

According to one aspect of the present invention, a pattern inspection apparatus includes:

- a stage on which a substrate on which a figure pattern is formed is placed;
- a first sensor configured to capture a first optical image of the substrate by receiving a first light flux transmitted through or reflected on a first region of the substrate;
- a second sensor configured to capture a second optical image of the substrate by receiving a second light flux transmitted through or reflected on a second region of the substrate at a same timing as light reception timing of the first sensor;
- a common detection optical system configured to illuminate a third region of the substrate with light for focus adjustment and guide the first light flux, the second light flux, and a third light flux reflected on the third region of the substrate to a common optical path of a detection system;
- a light flux separation mechanism configured to separate the first light flux, the second light flux, and the third light flux;
- a first detection optical system configured to form an image of a separated first light flux on the first sensor;

a second detection optical system configured to form an image of a separated second light flux on the second sensor;

a first detection mechanism configured to detect a change in a first positional relationship between a focal position of the first light flux and the first sensor;

a second detection mechanism configured to detect a change in a second positional relationship between a focal position of the second light flux and the second sensor;

a third detection mechanism configured to detect a change in a third positional relationship between a focal position of a separated third light flux and a focal position of the common detection optical system on the substrate side;

a first adjustment mechanism configured to automatically adjust the first positional relationship;

a second adjustment mechanism configured to automatically adjust the second positional relationship;

a third adjustment mechanism configured to automatically adjust the third positional relationship; and a control circuit configured to control at least two of the first adjustment mechanism, the second adjustment mechanism, and the third adjustment mechanism so as to adjust at least two of the first positional relationship, the second positional relationship, and the third positional relationship based on the change in the first positional relationship, the change in the second positional relationship, and the change in the third positional relationship.

According to another aspect of the present invention, a pattern inspection method includes:

capturing, with a first sensor, a first optical image of a substrate which is placed on a stage and on which a figure pattern is formed by receiving a first light flux transmitted through or reflected on a first region of the substrate;

capturing, with a second sensor, a second optical image of the substrate by receiving a second light flux transmitted through or reflected on a second region of the substrate at a same timing as light reception timing of the first sensor;

illuminating, with a common detection optical system, a third region of the substrate with light for focus adjustment and guiding, with the common detection optical system, the first light flux, the second light flux, and a third light flux reflected on the third region of the substrate to a common detection optical path;

separating the first light flux, the second light flux, and the third light flux;

forming, with a first detection optical system, an image of a separated first light flux on the first sensor;

forming, with a second detection optical system, an image of a separated second light flux on the second sensor;

detecting a change in a first positional relationship between a focal position of the first light flux and the first sensor;

detecting a change in a second positional relationship between a focal position of the second light flux and the second sensor;

detecting a change in a third positional relationship between a focal position of a separated third light flux and a focal position of the common detection optical system on the substrate side; and controlling at least two of a first adjustment mechanism automatically adjusting the first positional relationship, a second adjustment mechanism automatically adjusting the second positional relationship, and a third adjustment mechanism automatically adjusting the third positional relationship so as to adjust at least two of the first positional relationship, the second positional relationship, and the third positional relationship based on the change in the first positional relationship, the change in the second positional relationship, and the change in the third positional relationship.

DETAILED DESCRIPTION OF THE INVENTION

Hereinafter, an embodiment provides an inspection apparatus and an inspection method capable of focusing a light flux of each detection optical system on each imaging sensor even when a plurality of inspection images are simultaneously captured by different imaging sensors.

First Embodiment

Figure 1:
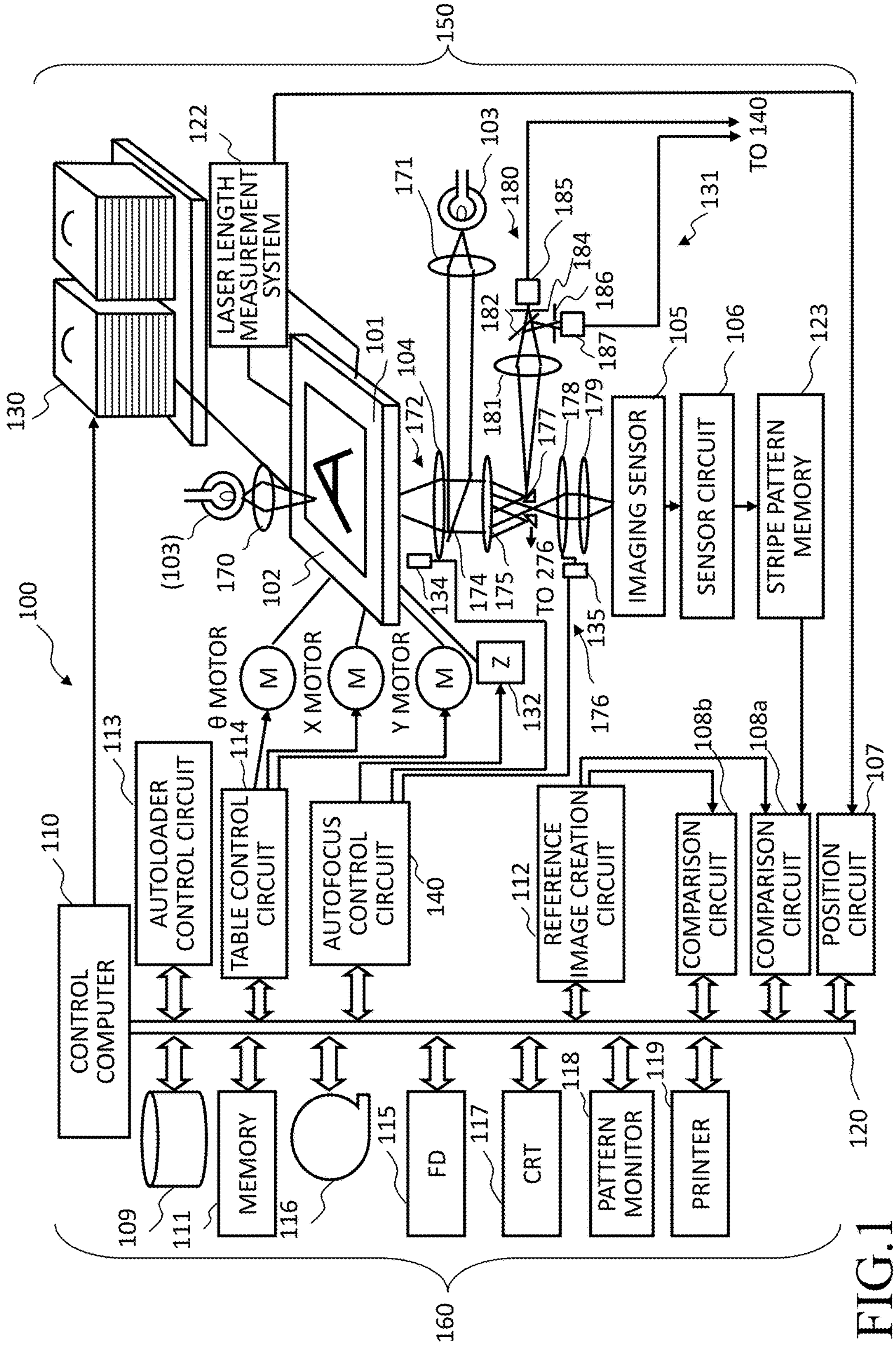
FIG. 1 is a configuration diagram illustrating an example of a configuration of a pattern inspection apparatus in a first embodiment.

FIG. 1 is a configuration diagram illustrating an example of a configuration of a pattern inspection apparatus in a first embodiment.

Figure 2:
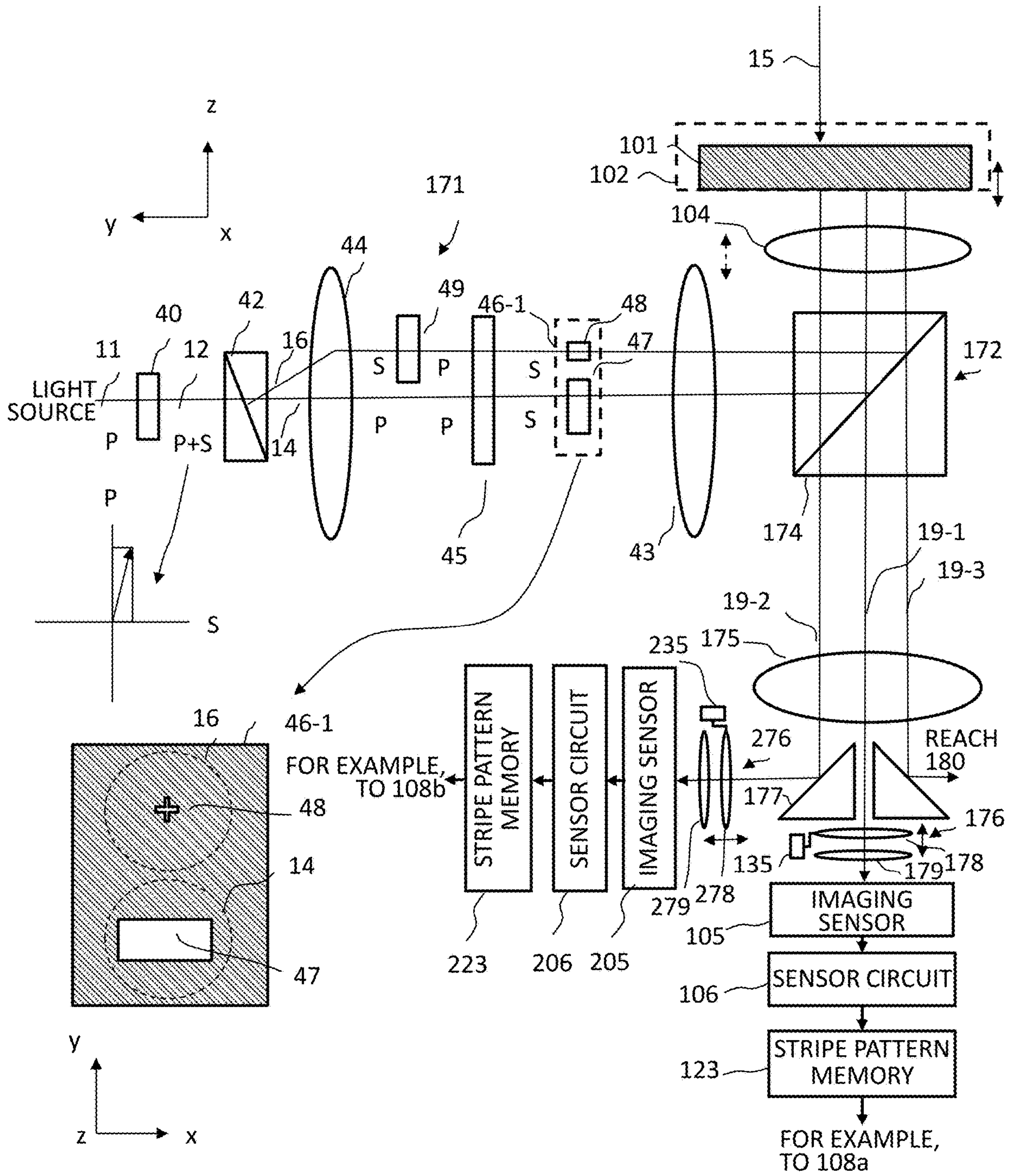
FIG. 2 is a configuration diagram illustrating an example of a configuration of a reflection illumination optical system and an example of a detection optical system in the first embodiment.

FIG. 2 is a configuration diagram illustrating an example of a configuration of a reflection illumination optical system and an example of a detection optical system in the first embodiment.

In FIGS. 1 and 2, an inspection apparatus 100 that inspects a defect of a pattern formed on an inspection target substrate, for example, a mask includes an optical image acquisition mechanism 150 and a control system circuit 160.

The optical image acquisition mechanism 150 includes a light source 103, a transmission illumination optical system 170, a reflection illumination optical system 171, an XYθ table 102 disposed movably, a common detection optical system 172, a separation mirror 177 (fixed mirror: an example of a light flux separation mechanism), a detection optical system 176, a detection optical system 276, an autofocus mechanism 131, an imaging sensor 105, a sensor circuit 106, a stripe pattern memory 123, an imaging sensor 205, a sensor circuit 206, a stripe pattern memory 223, a laser length measurement system 122, and an autoloader 130.

The common detection optical system 172 includes a magnifying optical system 104, a beam splitter 174, and an image forming lens 175.

The detection optical system 176 includes a collimator lens 178, an image forming lens 179, and a drive mechanism 135.

The detection optical system 276 includes a collimator lens 278, an image forming lens 279, and a drive mechanism 235.

The autofocus mechanism 131 includes an autofocus optical system 180, a light amount sensor 185 (first light amount sensor), a light amount sensor 187 (second light amount sensor), a Z drive mechanism 132, and a position sensor 134. The autofocus optical system 180, the light amount sensor 185, the light amount sensor 187, and an autofocus control circuit 140 form a confocal sensor.

The autofocus optical system 180 includes an image forming optical system 181, a beam splitter 182, a slit plate 184, and a slit plate 186. The autofocus optical system 180 guides light (third light flux) reflected on an autofocus (AF) visual field region (third region) of an inspected substrate 101 to the light amount sensor 185 and the light amount sensor 187. The beam splitter 182 is disposed in front of a focal position. The slit plate 184 is disposed at a front focal position (front pin position) and receives light transmitted through the beam splitter 182. The light amount sensor 185 measures an amount of light having passed through the slit plate 184 disposed at the front focal position (front pin position). The slit plate 186 is disposed at a rear focal position (rear pin position) and receives light split by the beam splitter 182. The light amount sensor 187 measures an amount of light having passed through the slit plate 186 disposed at the rear focal position (rear pin position).

The position sensor 134 measures a height position of a pattern formation surface of the substrate 101. For example, a height position of a glass substrate surface is measured.

On the XYθ table 102 (stage), the inspected substrate 101 conveyed from the autoloader 130 is disposed. Examples of the inspected substrate 101 include a photomask for exposure for transferring a pattern to a semiconductor substrate such as a wafer. A figure pattern to be inspected is formed on the photomask. The substrate 101 is placed on the XYθ table 102 with the pattern formation surface disposed downward, for example. This is an example of the stage of the XYθ table 102.

A line sensor or a two-dimensional sensor is used as the imaging sensor 105. For example, a time delay integration (TDI) sensor is preferably used. The TDI sensor has a plurality of photosensor elements (detection elements) arranged two-dimensionally. When each photosensor element captures an image, a predetermined image accumulation time is set. In the TDI sensor, outputs of a plurality of photosensor elements arranged in a scanning direction are integrated and output. The plurality of photosensor elements arranged in the scanning direction image the same pixel while shifting the time according to the movement of the XYθ table 102. When a line sensor is used, a plurality of photosensor elements are arranged in a direction orthogonal to the scanning direction.

In the control system circuit 160, a control computer 110 that controls the entire inspection apparatus 100 is connected to a position circuit 107, a plurality of comparison circuits 108, a reference image creation circuit 112, an autoloader control circuit 113, a table control circuit 114, an autofocus control circuit 140, a magnetic disk drive 109, a memory 111, a flexible disk device (FD) 115, a magnetic tape device 116, a CRT 117, a pattern monitor 118, and a printer 119 via a bus 120. Further, the imaging sensor 105 is connected to the stripe pattern memory 123, and the stripe pattern memory 123 is connected to, for example, a comparison circuit 108a among the plurality of comparison circuits 108. The imaging sensor 205 is connected to the stripe pattern memory 223, and the stripe pattern memory 223 is connected to, for example, a comparison circuit 108b among the plurality of comparison circuits 108. Further, the reference image creation circuit 112 is connected to the plurality of comparison circuits 108.

An output of the position sensor 134 is connected to the autofocus control circuit 140. Further, outputs of the light amount sensors 185 and 187 are connected to the autofocus control circuit 140.

Note that a series of "circuits" such as the position circuit 107, the plurality of comparison circuits 108, the reference image creation circuit 112, the autoloader control circuit 113, the table control circuit 114, and the autofocus control circuit 140 includes a processing circuit. The processing circuit includes an electric circuit, a computer, a processor, a circuit board, a quantum circuit, or a semiconductor device. Each circuit may be configured using the same processing circuit (one processing circuit), or different processing circuits (separate processing circuits) may be used. For example, a series of "circuits" such as the position circuit 107, the plurality of comparison circuits 108, the reference image creation circuit 112, the autoloader control circuit 113, the table control circuit 114, and the autofocus control circuit 140 may be configured by the control computer 110 and executed. Input data necessary for the position circuit 107, the plurality of comparison circuits 108, the reference image creation circuit 112, the autoloader control circuit 113, the table control circuit 114, and the autofocus control circuit 140 or a calculation result is stored in a memory (not illustrated) in each circuit or the memory 111 each time. Input data necessary for the control computer 110 or a calculation result is stored in a memory (not illustrated) in the control computer 110 or the memory 111 each time. A program for executing a processor or the like may be recorded on a record carrier body such as the magnetic disk drive 109, the FD 115, the magnetic tape device 116, or a read only memory (ROM).

In the inspection apparatus 100, a reflection inspection optical system and/or a transmission inspection optical system is mounted as an inspection optical system. A reflection inspection optical system having a higher magnification than the light source 103, the reflection illumination optical system 171, the beam splitter 174, the magnifying optical system 104, the XYθ table 102, the image forming lens 175, the collimator lens 178, and the image forming lens 179 is configured.

In addition, a transmission inspection optical system having a higher magnification than the light source 103, the transmission illumination optical system 170, the XYθ table 102, the magnifying optical system 104, the beam splitter 174, the image forming lens 175, the collimator lens 278, and the image forming lens 279 is configured.

The XYθ table 102 is driven by the table control circuit 114 under the control of the control computer 110. The XYθ table 102 is movable by a drive system such as a three-axis (X-Y-θ) motor that is driven in an X direction, a Y direction, and a θ direction. For these X-axis motor, Y-axis motor, and θ-axis motor, for example, step motors can be used. The XYθ table 102 is movable in a horizontal direction and a rotational direction by the motors of the X, Y, and θ axes. The XYθ table 102 is an example of a stage. In addition, a movement position of the substrate 101 arranged on the XYθ table 102 is measured by the laser length measurement system 122 and supplied to the position circuit 107. The conveyance processing of the substrate 101 from the autoloader 130 to the XYθ table 102 and the conveyance processing of the substrate 101 from the XYθ table 102 to the autoloader 130 are controlled by the autoloader control circuit 113.

The XYθ table 102 is driven in a z direction by the Z drive mechanism 132 controlled by the autofocus control circuit 140. As the Z drive mechanism 132, for example, a piezoelectric element or a step motor is preferably used. A height position of the XYθ table 102 is measured by the position sensor 134, and a measurement result is output to the autofocus control circuit 140. In the examples of FIGS. 1 and 2, a case where the Z drive mechanism 132 moves the XYθ table 102 is illustrated, but the present disclosure is not limited thereto. For example, the Z drive mechanism 132 may move the magnifying optical system 104 (objective lens) in the z direction.

The collimator lens 178 is driven in an optical axis direction by a drive circuit 135 controlled by the autofocus control circuit 140. As the drive circuit 135, for example, a piezoelectric element or a step motor is preferably used. In the examples of FIGS. 1 and 2, a case where the drive mechanism 135 moves the collimator lens 178 is illustrated, but the present disclosure is not limited thereto. The drive circuit 135 may drive the image forming lens 179 or the imaging sensor 105 in the optical axis direction, for example.

Similarly, the collimator lens 278 is driven in the optical axis direction by a drive circuit 235 controlled by the autofocus control circuit 140. As the drive circuit 235, for example, a piezoelectric element or a step motor is preferably used. In the examples of FIGS. 1 and 2, a case where the drive mechanism 235 moves the collimator lens 278 is illustrated, but the present disclosure is not limited thereto. The drive circuit 235 may drive the image forming lens 279 or the imaging sensor 205 in the optical axis direction, for example.

Write data (design data) to be a basis of pattern formation of the inspected substrate 101 is input from the outside of the inspection apparatus 100 and stored in the magnetic disk drive 109. A plurality of figure patterns are defined in the write data, and each figure pattern is normally configured by a combination of a plurality of element figures. There may be a figure pattern including one figure. On the inspected substrate 101, each corresponding pattern is formed based on each figure pattern defined in the write data.

Light generated from the light source 103 is separated into light for transmission inspection and light for reflection inspection by an optical element (not illustrated). FIG. 2 illustrates an example of a configuration of the reflection illumination optical system 171 on which light 11 for reflection inspection is incident.

The reflection illumination optical system 171 includes a ½ wavelength plate 40, a Rochon prism 42, a collimator lens 44, a ½ wavelength plate 49, a ½ wavelength plate 45, a slit plate 46-1, and a lens 43.

In the example of FIG. 2, a polarization direction (electric field vibration direction) of the light 11 incident on the reflection illumination optical system 171 is adjusted in a certain direction by an optical element (not illustrated). For example, the light 11 (P wave) having a polarization direction of, for example, 90 degrees from an x axis with respect to a plane (xz plane) orthogonal to a traveling direction of the light 11 is incident on the reflection illumination optical system 171.

The polarization direction of the light 11 (first light) incident on the ½ wavelength plate 40 is changed by adjusting an angle of the ½ wavelength plate 40. At that time, as illustrated in FIG. 2, the angle is adjusted so that, for example, a P wave component for inspection light is increased and, for example, an S wave component for measurement light for the autofocus is decreased. The light 12 including, for example, the P wave component and the S wave component output from the ½ wavelength plate 40 is incident on the Rochon prism 42, and separates, for example, the trajectory of the P wave component and the trajectory of the S wave component. For example, the P wave component is output while being straight, and the S wave component is output obliquely. As a result, the light can be separated into the inspection light 14 and the measurement light 16. Both the inspection light 14 and the measurement light 16 are incident on the collimator lens 44, and are refracted so as to have trajectories parallel to each other. For example, the inspection light 14 passes through the center of the collimator lens 44 and is output in a going-straight direction. The measurement light 16 passes through an outer peripheral portion of the collimator lens 44, is refracted in a converging direction, and is output in a direction parallel to the inspection light 14.

A polarization direction of the inspection light 14 having passed through the collimator lens 44 is a polarization direction of P waves, for example, whereas a polarization direction of the measurement light 16 having passed through the collimator lens 44 is a polarization direction of S waves, for example. Therefore, the measurement light 16 is incident on the ½ wavelength plate 49, is converted into light (for example, P waves) having the same polarization direction as that of the inspection light 14, and is output. Both the inspection light 14 and the measurement light 16 are incident on the ½ wavelength plate 45, are converted into S waves and output, for example, and are then incident on the slit plate 46-1 in parallel.

In the slit plate 46-1, for example, a rectangular slit opening 47 for forming a reflection visual field for reflection inspection is formed. In addition, in the slit plate 46-1, a slit opening 48 that limits the passage of measurement light (light for autofocus) for measuring a height position deviation amount of the substrate 101 from the focal height is formed. As the slit opening 48, for example, an opening having a cross pattern is preferably used. The inspection light 14 is emitted so as to include the entire slit opening 47.

Similarly, the measurement light 16 is emitted so as to include the entire slit opening 48. The inspection light 14 of the reflection visual field slit image that has passed through the slit opening 47 is incident on the beam splitter 174 through the lens 43 in the polarization direction of the S waves, for example. Similarly, the light 16 of the focus slit image (F slit image) having passed through the slit opening 48 is incident on the beam splitter 174 through the lens 43 in the polarization direction of the S waves, for example.

The reflection illumination optical system 171 illuminates an autofocus illumination visual field region (third region) of the substrate 101 with the measurement light 16 having passed through the slit plate 46-1. Further, the reflection illumination optical system 171 illuminates a reflection illumination visual field region (an example of a first region) of the substrate 101 with the inspection light 14. Specifically, the inspection light 14 and the measurement light 16 incident on the beam splitter 174 are reflected by the beam splitter 174, and are emitted to the substrate 101 by the magnifying optical system 104. In other words, the common detection optical system 172 illuminates a focus visual field region of the inspected substrate 101 with the measurement light 16 for focus adjustment.

Since images of the inspection light 14 and the measurement light 16 are formed by the same lens, the focal height position of the inspection light 14 and the focal height position of the measurement light 16 are the same. As described above, in the reflection inspection, the beam splitter 174 and the magnifying optical system 104 function as a part of the reflection illumination optical system 171.

On the other hand, even in the transmission illumination optical system 170, for example, the inspection light 15 in the same polarization direction (electric field vibration direction) as that of the inspection light 14 is emitted so as to include the entire rectangular slit opening (not illustrated) for forming the transmission visual field for transmission inspection, and the transmission illumination visual field region (an example of a second region) of the substrate 101 is illuminated with the inspection light 15 of the transmission visual field slit image that has passed through the slit opening.

A light flux 19-1 (first light flux) reflected by the reflection illumination visual field region (an example of the first region) of the substrate 101, a light flux 19-2 (second light flux) transmitted through the transmission illumination visual field region (an example of the second region) of the substrate 101, and a light flux 19-3 (third light flux) reflected by the autofocus illumination visual field region (an example of the third region) of the substrate 101 are all guided to a common detection optical path by the common detection optical system 172. Specifically, the light flux 19-1 reflected by the reflection illumination visual field region of the substrate 101, the light flux 19-2 transmitted through the transmission illumination visual field region of the substrate 101, and the light flux 19-3 reflected by the autofocus illumination visual field region of the substrate 101 all pass through the magnifying optical system 104, the beam splitter 174, and the image forming lens 175, which are the common detection optical system 172, and travel to the separation mirror 177. The image forming lens 175 forms images of three light fluxes 19-1, 19-2, and 19-3 on the reflection surface of the separation mirror 177.

The separation mirror 177 (an example of the light flux separation mechanism) has, for example, two reflection surfaces disposed toward different directions, and for example, a gap is formed between the reflection surfaces. Each reflection surface reflects a preset light flux and allows the preset light flux to pass through the gap. As a result, the separation mirror 177 (an example of the light flux separation mechanism) separates the light flux 19-1 reflected by the reflection illumination visual field region of the substrate 101, the light flux 19-2 transmitted through the transmission illumination visual field region of the substrate 101, and the light flux 19-3 reflected by the autofocus illumination visual field region of the substrate 101. Specifically, the light flux 19-1 reflected by the reflection illumination visual field region of the substrate 101 passes through, for example, the separation mirror 177 and travels to the detection optical system 176. The light flux 19-2 transmitted through the transmission illumination visual field region of the substrate 101 is reflected by the separation mirror 177, for example, and travels to the detection optical system 276. The light flux 19-3 reflected by the autofocus illumination visual field region of the substrate 101 is reflected by the separation mirror 177 and travels to the autofocus optical system 180.

An image of the separated light flux 19-1 incident on the detection optical system 176 is formed on the imaging sensor 105 (first sensor) by the detection optical system 176 (first detection optical system). Specifically, the light flux 19-1 incident on the detection optical system 176 is incident on the detection optical system 176 while spreading in a diverging direction, is refracted by the collimator lens 178, becomes parallel light, and travels to the image forming lens 179. Then, the image forming lens 179 refracts the light flux 19-1 in a converging direction to form an image on the detection surface of the imaging sensor 105. The imaging sensor 105 captures an optical image (first optical image) of the inspected substrate 101 by receiving the light flux 19-1 (or a light flux transmitted through the transmission illumination visual field region) reflected on, for example, the reflection illumination visual field region (first region) of the inspected substrate 101.

An image of the separated light flux 19-2 incident on the detection optical system 276 is formed on the imaging sensor 205 (second sensor) by the detection optical system 276 (second detection optical system). Specifically, the light flux 19-2 incident on the detection optical system 276 is incident on the detection optical system 276 while spreading in the diverging direction, is refracted by the collimator lens 278, becomes parallel light, and travels to the image forming lens 279. Then, the image forming lens 279 refracts the light flux 19-2 in the converging direction to form an image on the detection surface of the imaging sensor 205. The imaging sensor 205 captures an optical image (second optical image) of the inspected substrate 101 by receiving the light flux 19-2 transmitted through, for example, the transmission illumination visual field region (second region) of the inspected substrate 101 (or a light flux reflected on the reflection illumination visual field region) at the same timing as light reception timing of the imaging sensor 105. The light flux 19-3 incident on the autofocus optical system 180 is refracted in a condensing direction by the image forming optical system 181, and is emitted to the beam splitter 182. A part of the light transmitted through the beam splitter 182 is limited by the slit plate 184 at the front focal position (front pin position), and an amount of the light having passed through the slit plate 184 is measured by the light amount sensor 185. A part of the light split by the beam splitter 182 is limited by the slit plate 186 at the rear focal position (rear pin position), and an amount of the light having passed through the slit plate 186 is measured by the light amount sensor 187. As a result, the light amount at the front focal position and the light amount at the rear focal position can be measured. Light amount data (light intensity data) of each of the light amount at the front focal position and the light amount at the rear focal position measured during scanning is output to the autofocus control circuit 140.

Here, in FIGS. 1 and 2, the configurations necessary for describing the first embodiment are described. It goes without saying that the inspection apparatus 100 may normally include other necessary configurations.

Figure 3:
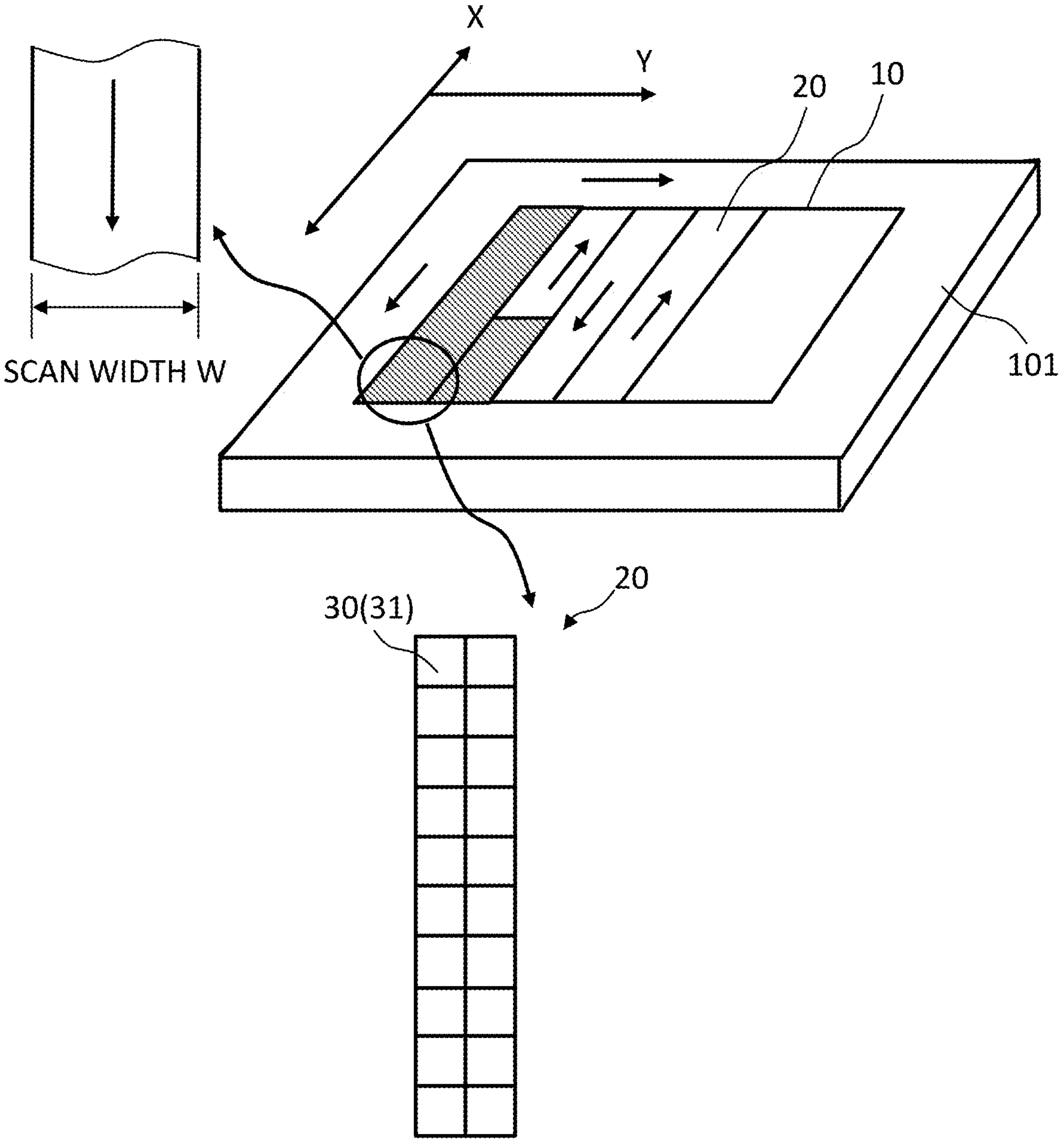
FIG. 3 is a conceptual diagram for describing an inspection region in the first embodiment.

FIG. 3 is a conceptual diagram for describing an inspection region in the first embodiment. As illustrated in FIG. 3, an inspection region 10 (the entire inspection region) of the substrate 101 is virtually divided into a plurality of strip-shaped inspection stripes 20 having a scan width W of the imaging sensor 105 (205), for example, in the Y direction.

Note that, as will be described later, in the first embodiment, a partial detection element group of the plurality of detection elements of the imaging sensor 105 (205) is used not for capturing an inspection image but for focal point detection of the detection optical system 176 (276). Therefore, the scan width W here refers to a width of a detection element array that captures the inspection image excluding a detection element array for focal point detection.

In addition, the inspection apparatus 100 acquires an image (stripe region image) for each inspection stripe 20. For each of the inspection stripes 20, an image of a figure pattern arranged in the inspection stripe 20 is captured in a longitudinal direction (X direction) of the stripe region using laser light (inspection light). In order to prevent missing of an image, the plurality of inspection stripes 20 are preferably set such that adjacent inspection stripes 20 overlap each other with a predetermined margin width.

The optical image is acquired while the imaging sensor 105 continuously moves relatively in the X direction by the movement of the XYθ table 102. The imaging sensor 105 (205) continuously captures an optical image having the scan width Was illustrated in FIG. 3. In the first embodiment, after the imaging sensor captures an optical image in one inspection stripe 20, the imaging sensor continuously captures an optical image having the scan width W while moving to a position of the next inspection stripe 20 in the Y direction and then moving in an opposite direction. That is, imaging is repeated in a forward (FWD)-backward (BWD) direction in which a forward path and a backward path are in opposite directions.

In actual inspection, as illustrated in FIG. 3, a stripe region image of each inspection stripe 20 is divided into images (frame images 31) of a plurality of rectangular frame regions 30. In addition, the inspection is performed for each frame image 31 of the frame region 30. For example, the image is divided into a size of 512×512 pixels. Therefore, a reference image to be compared with the frame image 31 of the frame region 30 is similarly created for each frame region 30.

Here, the imaging direction is not limited to repetition of forward (FWD)-backward (BWD). Imaging may be performed from one direction. For example, the imaging direction may be repetition of FWD-FWD. Alternatively, the imaging direction may be repetition of BWD-BWD.

Figure 4:
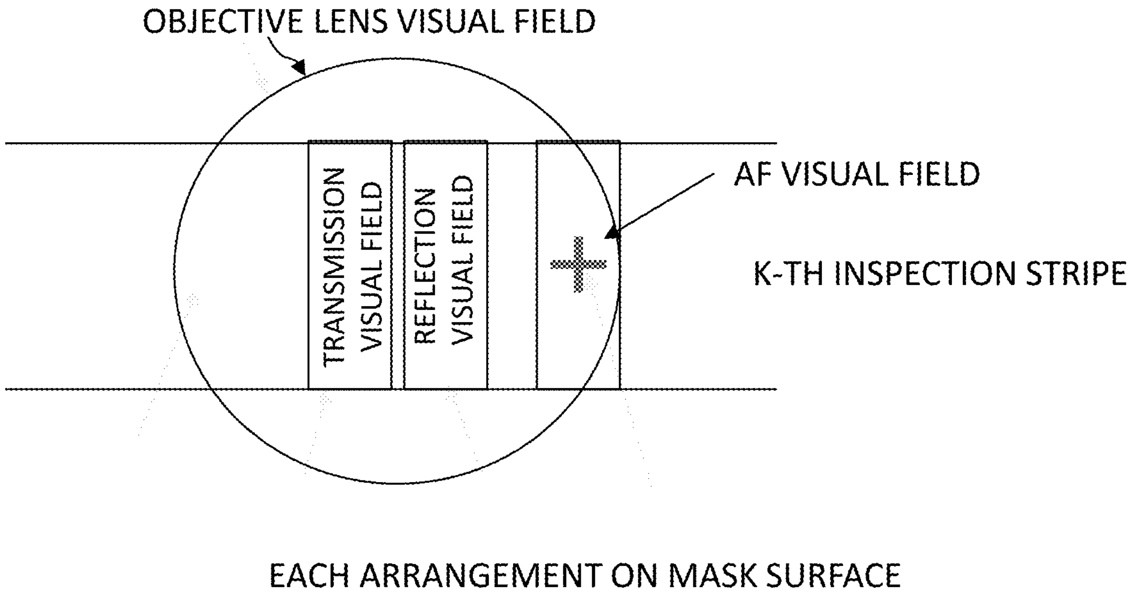
FIG. 4 is a diagram illustrating an example of each region on a substrate surface in the first embodiment.

FIG. 4 is a diagram illustrating an example of each region on a substrate surface in the first embodiment. FIG. 4 illustrates an example of each irradiation position when a k-th inspection stripe 20 is scanned. In FIG. 4, when each inspection stripe 20 is scanned, for the target inspection stripe 20, a transmission illumination visual field region (an example of the second region) of the substrate 101 is irradiated with the transmission visual field (slit image) of the inspection light 15 for transmission inspection, and a reflection illumination visual field region (an example of the first region) is irradiated with the reflection visual field (slit image) of the inspection light 14 for reflection inspection. In addition, an autofocus (AF) illumination visual field region (an example of the third region) of the substrate 101 is irradiated with an autofocus (AF) image of the measurement light. The transmission illumination visual field region and the reflection illumination visual field region of the substrate 101 are arranged in the scanning direction. In addition, the AF visual field region is arranged, for example, near the front in the scanning direction with respect to each inspection visual field. The positions of the transmission illumination visual field region, the reflection illumination visual field region, and the AF visual field region change from moment to moment with the progress of the scan operation by the movement of the XYθ table 102 while maintaining the relative positional relationship.

Figure 5:
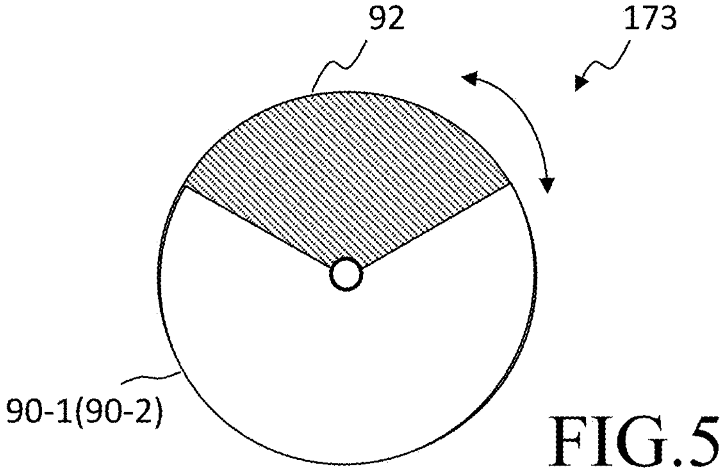
FIG. 5 is a top view of another example of a light flux separation mechanism in the first embodiment.

FIG. 5 is a top view of another example of the light flux separation mechanism in the first embodiment.

Figure 6:
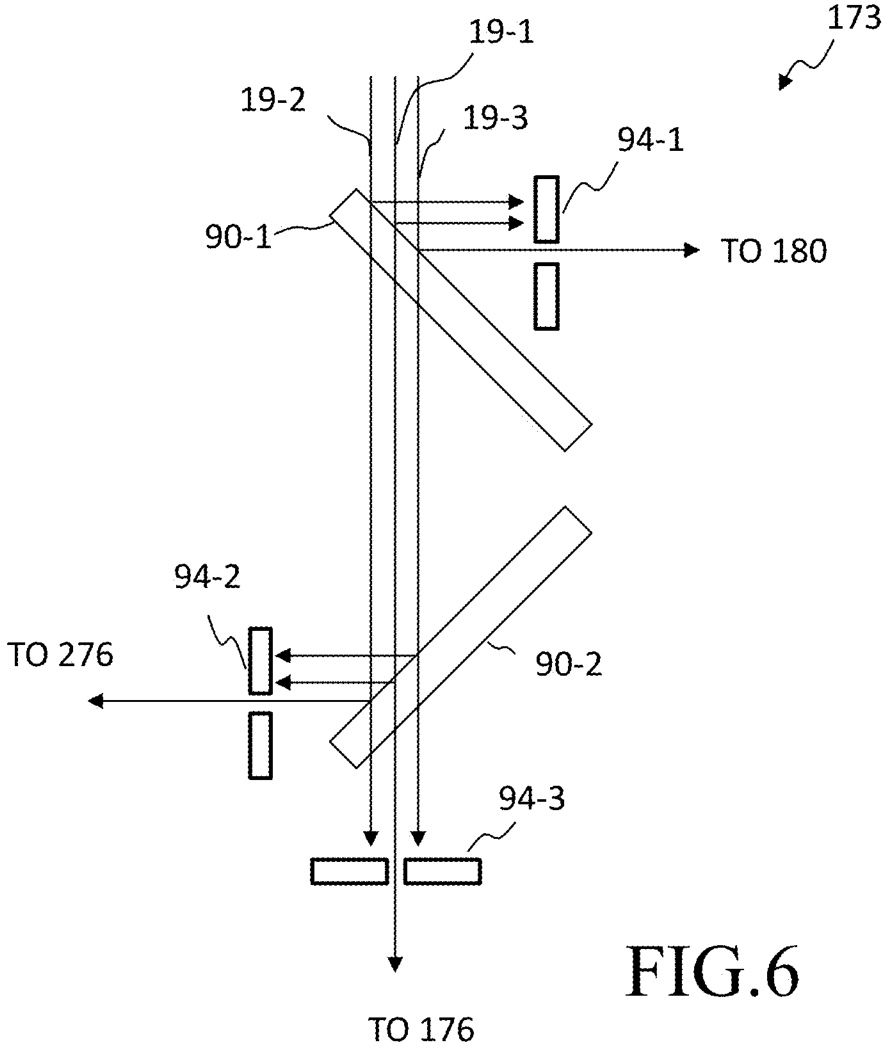
FIG. 6 is a cross-sectional view of another example of the light flux separation mechanism in the first embodiment.

FIG. 6 is a cross-sectional view of another example of the light flux separation mechanism in the first embodiment.

In the example of FIG. 1, the case where the fixed separation mirror 177 is used as an example of the light flux separation mechanism has been described, but the present disclosure is not limited thereto. FIGS. 5 and 6 illustrate a time division mirror mechanism 173 as another example of the light flux separation mechanism. The time division mirror mechanism 173 includes two disk-shaped time division mirrors 90-1 and 90-2, and three slit plates 94-1, 94-2, and 94-3 in which an opening is formed in a center portion. Each of the time division mirrors 90-1 and 90-2 is made of a glass substrate, and a mirror 92 is disposed in, for example, a ⅓ region of a surface thereof. For example, the mirror 92 is disposed in a fan-shaped region in a range of 120° from the rotation center of the glass substrate. For example, the two time division mirrors 90-1 and 90-2 are disposed to be inclined at an angle of 45° in opposite directions. The light fluxes 19-1 and 19-2 of the respective inspection visual fields and the light flux 19-3 of the AF visual field that have passed through the common detection optical system 172 are incident on a position shifted from the rotation center of the first-stage time division mirror 90-1. In this case, the light fluxes 19-1 and 19-2 of the respective inspection visual fields and the light flux 19-3 of the AF visual field are reflected, for example, in an orthogonal direction for ⅓ of a time during which the time division mirror 90-1 makes one rotation, and the remaining ⅔ of the time passes. As a result, the slit plate 94-1 allows, for example, the light flux 19-3 of the reflected light of the AF image to pass through the opening in the reflected light flux group, and the remaining light flux is shielded by a shielding plate. Then, the light flux having passed through the slit plate 94-1 travels to the autofocus optical system 180. In addition, the light fluxes of the respective inspection visual fields and the light flux of the AF visual field that have passed through the time division mirror 90-1 are incident on a position shifted from the rotation center of the second-stage time division mirror 90-2. Then, the light fluxes 19-1 and 19-2 of the respective inspection visual fields and the light flux 19-3 of the AF visual field are reflected, for example, in the orthogonal direction for ⅓ of a time during which the time division mirror 90-2 makes one rotation, and the remaining ⅔ of the time passes. As a result, the slit plate 94-2 allows, for example, the light flux 19-2 of the transmitted light of the slit image of the transmission visual field to pass through the opening in the reflected light flux group, and the remaining light flux is shielded by the shielding plate.

The light flux 19-2 having passed through the slit plate 94-2 travels to the detection optical system 276. In addition, the slit plate 94-3 allows, for example, the light flux 19-1 of the reflected light of the slit image of the reflection visual field to pass through the opening in the transmitted light flux group, and the remaining light flux is shielded by the shielding plate. The light flux 19-1 having passed through the slit plate 94-3 travels to the detection optical system 176. By synchronizing the rotating phases of the time division mirrors 90-1 and 90-2 and adjusting the positions of the rotating mirrors 92 so as not to overlap each other, the light fluxes can be separated into three light fluxes by, for example, ⅓ of one rotation time. As a result, the light fluxes can be separated in time division.

Figure 7:
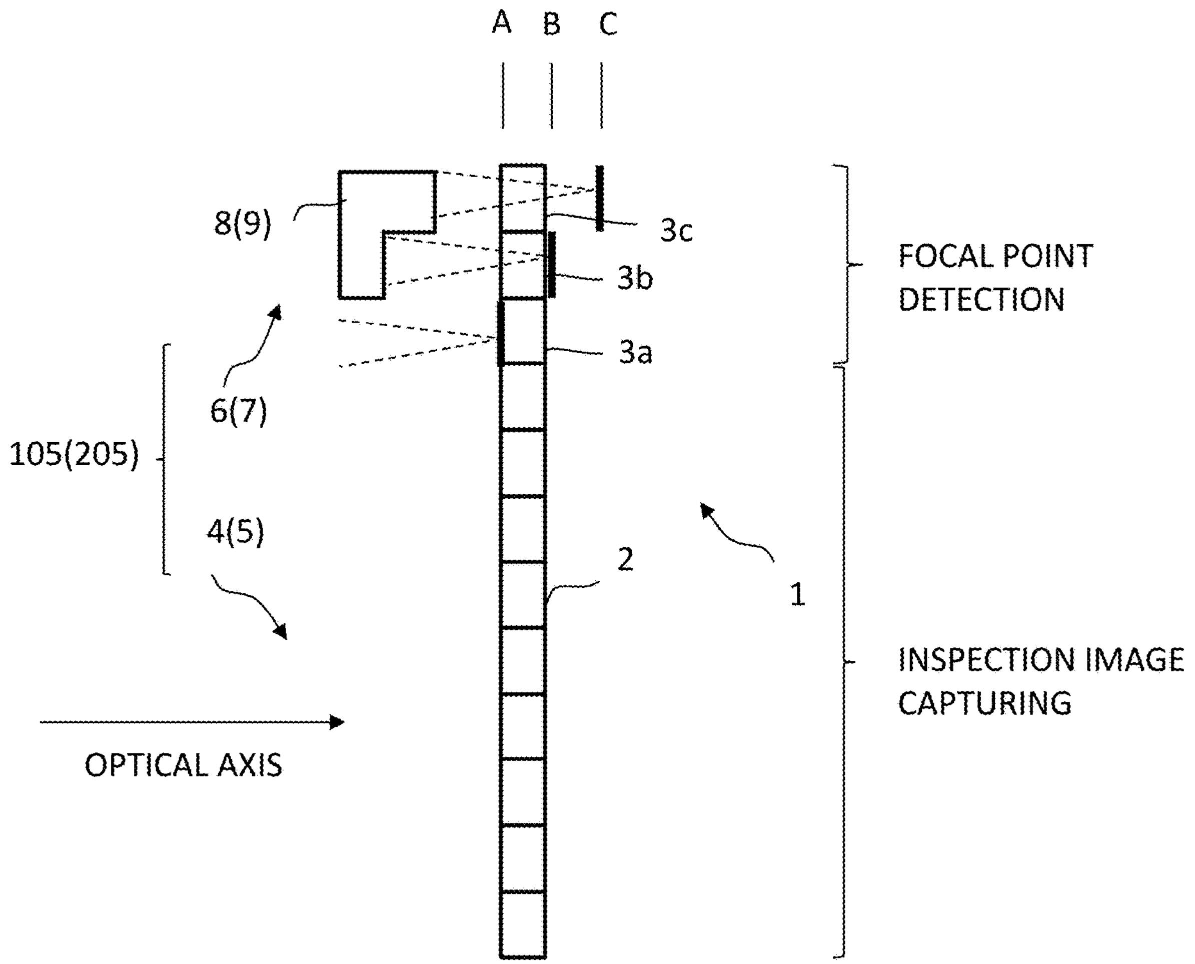
FIG. 7 is a diagram illustrating an example of a configuration of an imaging sensor in the first embodiment.

FIG. 7 is a diagram illustrating an example of a configuration of an imaging sensor in the first embodiment. The imaging sensor 105 includes a plurality of detection elements 1 (first detection elements). Similarly, the imaging sensor 205 includes a plurality of detection elements 1 (second detection elements).

Among the plurality of detection elements 1 of the imaging sensor 105, some detection elements 3*a*, 3*b*, and 3*c* are used as elements forming a detector 6 (first detector). The remaining detection elements 2 are used as a sensor 4 for image capturing. The detector 6 further includes an optical element 8 (first optical element).

Among the plurality of detection elements 1 of the imaging sensor 205, some detection elements 3*a*, 3*b*, and 3*c* are used as elements forming a detector 7 (second detector). The remaining detection elements 2 are used as a sensor 5 for image capturing. The detector 7 further includes an optical element 9 (second optical element).

The optical element 8 (9) is disposed, for example, in front of optical paths of the detection elements 3*b* and 3*c*. The optical element 8 (9) is formed of, for example, a block of a glass material, and is formed such that a thickness of a portion that allows light incident on the detection element 3*b* to pass therethrough and a thickness of a portion that allows light incident on the detection element 3*c* to pass therethrough are different from each other. Light passing through the block of the glass material travels in parallel without converging. As a result, it is possible to shift a focal position of the light incident on the detection element 3*a*, a focal position of the light incident on the detection element 3*b*, and a focal position of the light incident on the detection element 3*c* among the light fluxes whose images are formed by the image forming lens 179 (279). In the example of FIG. 7, for example, in a case where a light flux focused on a position A of a detection surface of the detection element 3*a* is incident on the imaging sensor 105 (205), in the detection element 3*a*, an image is incident at the same focal position A as each detection element 2 of the sensor 4 (5) for image capturing. In the detection element 3*b*, an image whose focal position is a position B behind each detection element 2 of the sensor 4 (5) for image capturing is incident. In the detection element 3*c*, an image whose focal position is a position C behind the detection element 3*b* is incident. Therefore, the detectors 6 and 7 can generate images of three different focal positions and detect them.

The detector 6 (first detector) detects, for example, a change in a positional relationship (first positional relationship) between a focal position of the light flux 19-1 (first light flux) which is reflected by the reflection illumination visual field region and of which an image is formed by the detection optical system 176 and the imaging sensor 105. The detector 6 (an example of a first detection mechanism) detects, for example, a change in the positional relationship between the focal position of the light flux 19-1 and the imaging sensor 105 using the light flux 19-1 that has passed through the optical element 8. In addition, the detector 6 (an example of the first detection mechanism) detects a change in the positional relationship between the focal position of the light flux 19-1 and the imaging sensor 105 using, for example, gray scale level data detected by receiving a part of the light flux 19-1 by a part of the plurality of detection elements 1 of the imaging sensor 105.

The detector 7 (second detector) detects, for example, a change in a positional relationship (second positional relationship) between the imaging sensor 205 and the focal position of the light flux 19-2 (second light flux) which is transmitted through the transmission illumination visual field region and of which an image is formed by the detection optical system 276. The detector 7 (an example of a second detection mechanism) detects, for example, a change in the positional relationship between the focal position of the light flux 19-2 and the imaging sensor 205 using the light flux 19-2 that has passed through the optical element 9. In addition, the detector 7 (an example of the second detection mechanism) detects a change in the positional relationship between the focal position of the light flux 19-2 and the imaging sensor 205 using, for example, gray scale level data detected by receiving a part of the light flux 19-2 by a part of the plurality of detection elements 1 of the imaging sensor 205.

Figure 8:
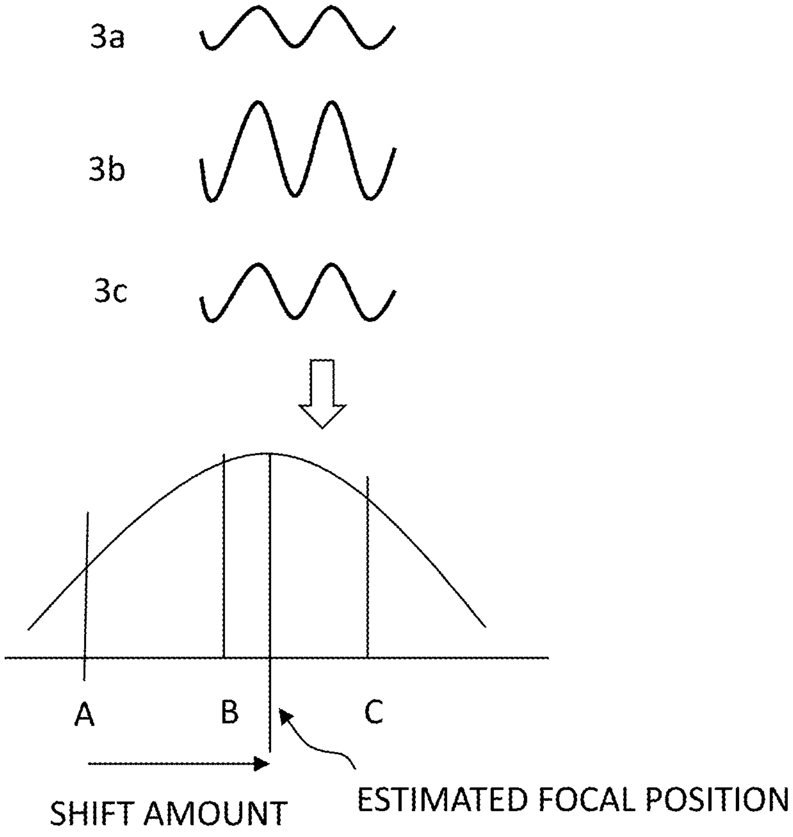
FIG. 8 is a diagram for describing an example of a focal point detection method using a part of the imaging sensor in the first embodiment.

FIG. 8 is a diagram for describing an example of a focal point detection method using a part of the imaging sensor in the first embodiment. In the example of FIG. 8, an example of a gray scale level value profile of an image detected by the detection elements 3*a*, 3*b*, and 3*c* in a case where a line-and-space pattern is scanned is illustrated. For example, a gray scale level difference between a gray scale level value (maximum value) of a white pattern and a gray scale level value (minimum value) of a black pattern is measured. As the scan operation progresses, a gray scale level value of each pixel is accumulated, so that a profile is obtained. Since a height position on an optical axis where the profile with the maximum gray scale level difference is obtained is a position where the contrast of the image is maximized, the height position is the focal position. In the example of FIG. 8, the gray scale level difference obtained by the detection element 3*b* is largest. The gray scale level difference obtained by the detection element 3*c* is next, and the gray scale level difference obtained by the detection element 3*a* is smallest. A case where a profile having the maximum gray scale level difference is obtained by the detection element 3*a* is a design focal position. Therefore, a deviation amount of the focal position from the position A of the detection element 3*a* can be calculated by fitting the gray scale level difference in each detection element. In the detector 6 (7) of FIG. 7, for example, in a case where the measurement result of the example of FIG. 8 is obtained, it is possible to calculate that the focal position of the light flux of the detection target exists before the detection surface of the detection element 3*a* on the optical axis by the total length of the length from the position A to the position B and the length from the position B to the position on the way to the position C.

Note that, for example, even in a case where the focal position of the light flux to be detected exists behind the detection surface of the detection element 3*a* on the optical axis, if the gray scale level difference between the black and white patterns in a state where the pits are aligned is measured in advance, the deviation amount can be calculated by fitting similarly.

Note that, in the example of FIG. 7, a case where each detection element for focal point detection is arranged one by one has been illustrated, but the present disclosure is not limited thereto. A plurality of detection elements may be arranged at each position in a direction orthogonal to the scanning direction.

Figure 9:
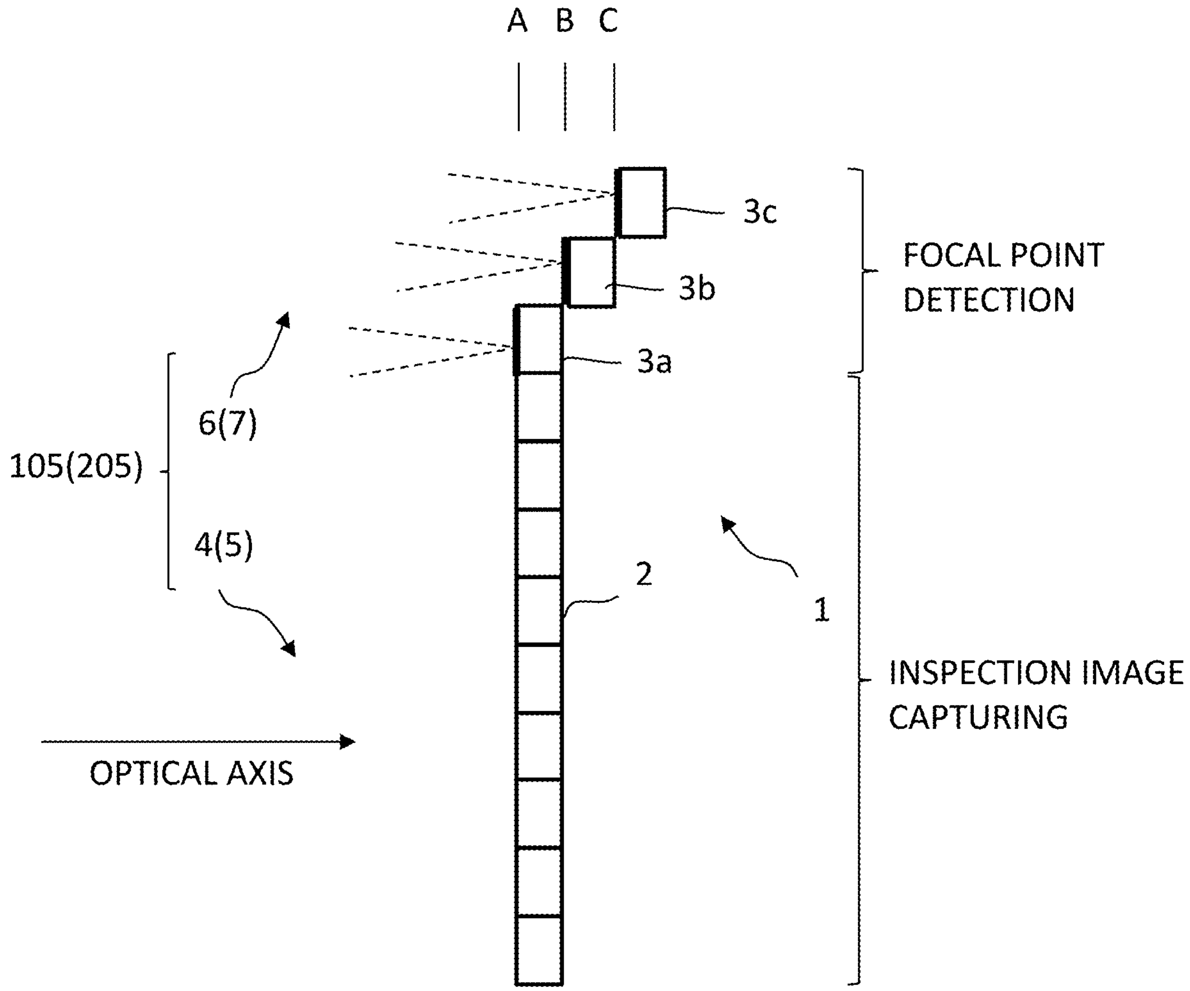
FIG. 9 is a diagram illustrating another example of the configuration of the imaging sensor in the first embodiment.

FIG. 9 is a diagram illustrating another example of the configuration of the imaging sensor in the first embodiment. The example of FIG. 9 is similar in that among the plurality of detection elements 1 of the imaging sensor 105, some detection elements 3*a*, 3*b*, and 3*c* are used as elements forming the detector 6 (first detector or first detection mechanism), and the remaining detection elements 2 are used as the sensor 4 for image capturing. At least one of some detection elements 3*a*, 3*b*, and 3*c* is disposed at a height position in the optical axis direction different from those of the other detection elements 2. In the example of FIG. 9, the detection element 3*a* is disposed at the same height position A on the optical axis as the detection element 2. The detection element 3*b* is disposed at the height position B rear side of the detection element 3*a* on the optical axis. The detection element 3*c* is disposed at the height position C rear side of the detection element 3*b* on the optical axis.

Similarly, among the plurality of detection elements 1 of the imaging sensor 205, some detection elements 3*a*, 3*b*, and 3*c* are used as elements forming the detector 7 (second detector or second detection mechanism), and the remaining detection elements 2 are used as the sensor 5 for image capturing. At least one of some detection elements 3*a*, 3*b*, and 3*c* is disposed at a height position in the optical axis direction different from those of the other detection elements 2. In the example of FIG. 9, the detection element 3*a* is disposed at the same height position A on the optical axis as the detection element 2. The detection element 3*b* is disposed at the height position B on the rear side of the detection element 3*a* on the optical axis. The detection element 3*c* is disposed at the height position C on the rear side of the detection element 3*b* on the optical axis. In the example of FIG. 9, the detection element is disposed at the same height position as the detection element 2 or at a height position behind the detection element 2 on the optical axis, but the present disclosure is not limited thereto. It is also preferable to dispose the detection element at a height position on the front side of the detection element 2 on the optical axis. Alternatively, by arranging the detection elements at a height position on the front side of the detection element 2 on the optical axis, at the same height position as the detection element 2, and at a height position on the rear side of the detection element 2 on the optical axis, detection can be performed at three points of the front focal position, the design focal position, and the rear focal position.

By shifting the height position on the optical axis, light at different focal positions can be detected. In the detector 6 (7) of FIG. 9, for example, in a case where the measurement result of the example of FIG. 8 is obtained, it is possible to calculate that the focal position of the light flux of the detection target exists behind the detection surface of the detection element 3*a* on the optical axis by the total length of the length from the position A to the position B and the length from the position B to the position on the way to the position C.

Here, the inspection apparatus 100 in the first embodiment has an autofocus function at three points of a focal point adjustment function in the common detection optical system 172, a focal point adjustment function in the detection optical system 176, and a focal point adjustment function in the detection optical system 276. For example, since the inspection light 14 for reflection inspection and the measurement light 16 for focal point adjustment in the common detection optical system 172 illuminate the substrate 101 by the same reflection illumination optical system 171, the focal position tends to be at the same position. On the other hand, since the inspection light 15 for transmission inspection illuminates the substrate by different optical systems, the focal position is easily shifted. Therefore, there is a high possibility that the focal position of at least one of the inspection light 14 for reflection inspection and the inspection light 15 for transmission inspection is shifted only by performing the focal point adjustment in the common detection optical system 172. Therefore, in the first embodiment, for example, in simultaneous acquisition of two different optical images of the reflection inspection image and the transmission inspection image, imaging is performed in a state where at least two of the focal point adjustment function in the common detection optical system 172, the focal point adjustment function in the detection optical system 176, and the focal point adjustment function in the detection optical system 276 are focused. Hereinafter, it will be specifically described.

Figure 10:
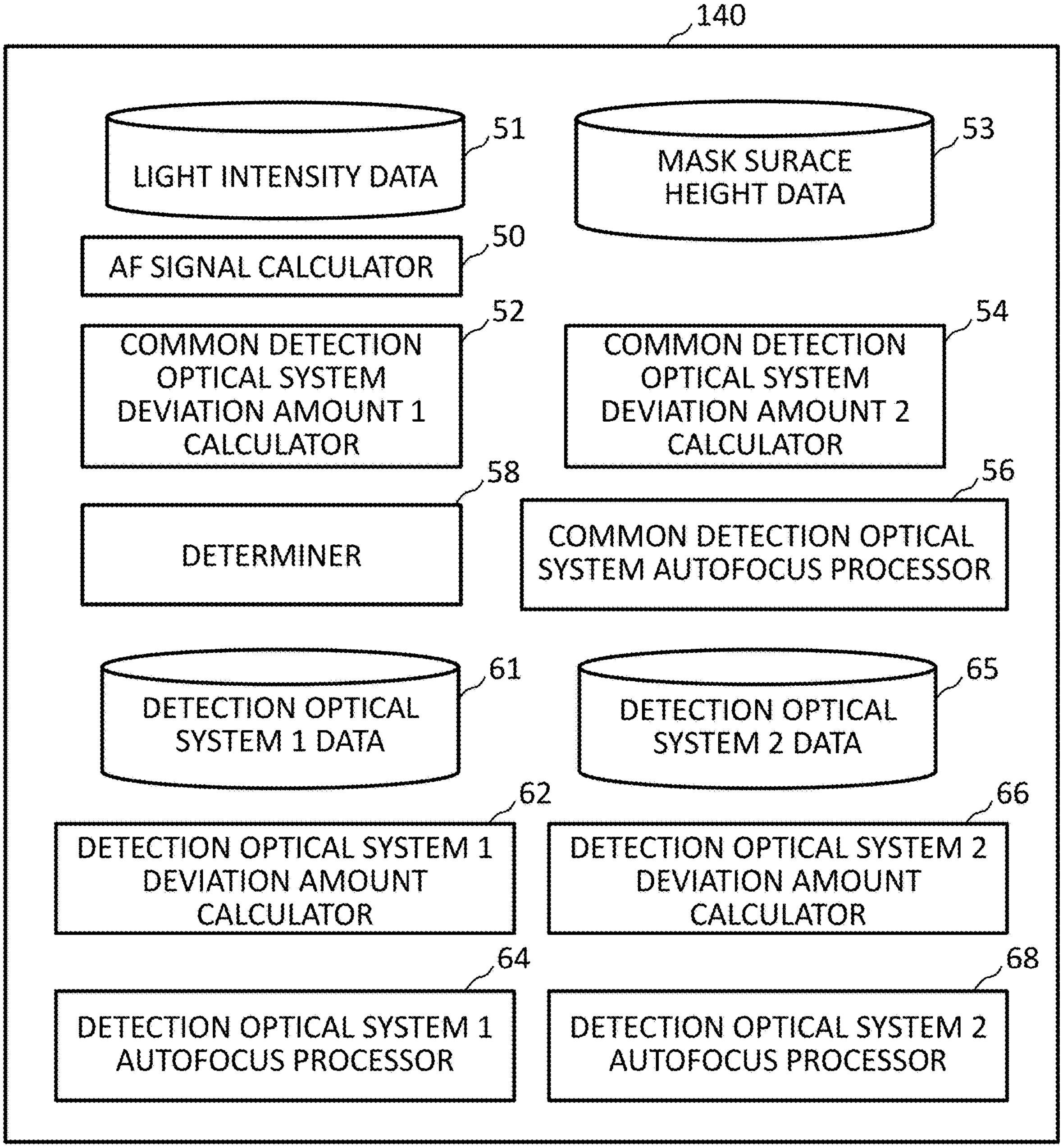
FIG. 10 is a block diagram illustrating an example of an internal configuration of an autofocus control circuit in the first embodiment.

FIG. 10 is a block diagram illustrating an example of an internal configuration of an autofocus control circuit in the first embodiment. In FIG. 10, in the autofocus control circuit 140, storage devices 51, 53, 61, and 65 such as a magnetic disk drive, an autofocus (AF) signal calculator 50, a common detection optical system deviation amount 1 calculator 52, a common detection optical system deviation amount 2 calculator 54, a common detection optical system autofocus processor 56, a determiner 58, a detection optical system 1 deviation amount calculator 62, a detection optical system 1 autofocus processor 64, a detection optical system 2 deviation amount calculator 66, and a detection optical system 2 autofocus processor 68 are arranged.

A series of "units" such as the autofocus (AF) signal calculator 50, the common detection optical system deviation amount 1 calculator 52, the common detection optical system deviation amount 2 calculator 54, the common detection optical system autofocus processor 56, the determiner 58, the detection optical system 1 deviation amount calculator 62, the detection optical system 1 autofocus processor 64, the detection optical system 2 deviation amount calculator 66, and the detection optical system 2 autofocus processor 68 includes a processing circuit. The processing circuit includes an electric circuit, a computer, a processor, a circuit board, a quantum circuit, or a semiconductor device. Further, a common processing circuit (same processing circuit) may be used for each "unit". Alternatively, a different processing circuit (separate processing circuit) may be used. Input data or calculated results necessary for the autofocus (AF) signal calculator 50, the common detection optical system deviation amount 1 calculator 52, the common detection optical system deviation amount 2 calculator 54, the common detection optical system autofocus processor 56, the determiner 58, the detection optical system 1 deviation amount calculator 62, the detection optical system 1 autofocus processor 64, the detection optical system 2 deviation amount calculator 66, and the detection optical system 2 autofocus processor 68 are stored in a memory (not illustrated) or the memory 111 in the autofocus control circuit 140 each time.

Figure 11:
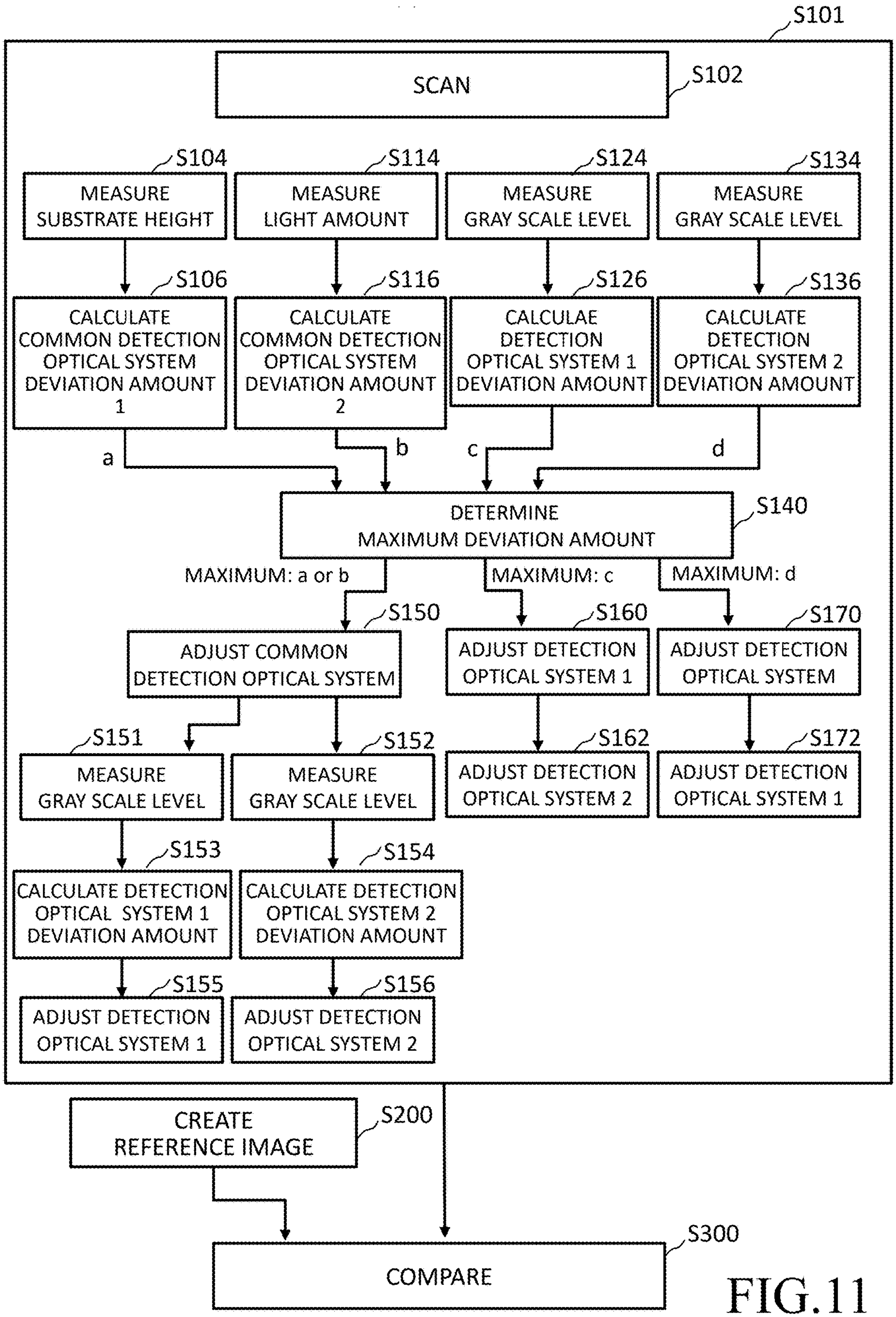
FIG. 11 is a flowchart illustrating an example of main steps of an inspection method in the first embodiment.

FIG. 11 is a flowchart illustrating an example of main steps of an inspection method in the first embodiment. In FIG. 11, the inspection method in the first embodiment performs a series of steps including an image acquisition step (S101), a reference image creation step (S200), and a comparison step (S300).

The image acquisition step (S101) performs a series of steps including, as internal steps thereof, a scan step (S102), a substrate height measurement step (S104), a common detection optical system deviation amount 1 calculation step (S106), a light amount measurement step (S114), a common detection optical system deviation amount 2 calculation step (S116), a gray scale level measurement step (S124), a detection optical system 1 deviation amount calculation step (S126), a gray scale level measurement step (S134), a detection optical system 2 deviation amount calculation step (S136), a maximum deviation amount determination step (S140), a common detection optical system adjustment step (S150), a gray scale level measurement step (S151), a gray scale level measurement step (S152), a detection optical system 1 deviation amount calculation step (S153), a detection optical system 2 deviation amount calculation step (S154), a detection optical system 1 adjustment step (S155), a detection optical system 2 adjustment step (S156), a detection optical system 1 adjustment step (S160), a detection optical system 2 adjustment step (S162), a detection optical system 2 adjustment step (S170), and a detection optical system 1 adjustment step (S172).

As the image acquisition step (S101), the autofocus control circuit 140 controls at least two of the autofocus mechanism 131, the drive mechanism 135, and the drive mechanism 235 so as to adjust at least two of a positional relationship between the focal position of the light flux 19-1 and the imaging sensor 105, a positional relationship between the focal position of the light flux 19-2 and the imaging sensor 205, and a positional relationship between the focal position of the light flux 19-3 and the focal position of the common detection optical system 172 on the substrate 101 side, based on a change in the positional relationship between the focal position of the light flux 19-1 and the imaging sensor 105, a change in the positional relationship between the focal position of the light flux 19-2 and the imaging sensor 205, and a change in the positional relationship between the focal position of the light flux 19-3 and the focal position of the common detection optical system 172 on the substrate 101 side. Then, in a state in which at least two of the autofocus mechanism 131, the drive mechanism 135, and the drive mechanism 235 are controlled, in the optical image acquisition mechanism 150, in a state in which the inspected substrate 101 is placed on the XYθ table 102, the light reflected on the inspected substrate 101 irradiated with the inspection light is received by the imaging sensor 105 through the detection optical system 176, and the light transmitted through the inspected substrate 101 is received by the imaging sensor 205 through the detection optical system 276, so that an optical image to be the reflection inspection image of the inspected substrate 101 and an optical image to be the transmission inspection image are simultaneously captured.

The autofocus control circuit 140 determines the positional relationship in which a change amount is maximized among the change in the positional relationship between the focal position of the light flux 19-1 and the imaging sensor 105, the change in the positional relationship between the focal position of the light flux 19-2 and the imaging sensor 205, and the change in the positional relationship between the focal position of the light flux 19-3 and the focal position of the common detection optical system 172 on the substrate 101 side. In addition, the autofocus control circuit 140 controls at least two of the autofocus mechanism 131, the drive mechanism 135, and the drive mechanism 235 so as to first adjust the positional relationship in which the change amount is maximized. Specifically, the following operation is performed.

As the scan step (S102), the imaging sensor 105 captures an optical image (first optical image) of the substrate 101 by receiving the light flux 19-1 transmitted through or reflected on a certain visual field region (first region) (for example, reflection illumination visual field region) of the substrate 101 which is placed on the XYθ table 102 and on which the figure pattern is formed. In the example of FIG. 1, the imaging sensor 105 captures a reflection inspection image (first optical image) of the substrate 101 by receiving the light flux 19-1 reflected on the reflection illumination visual field region of the substrate 101.

In addition, the imaging sensor 205 captures an optical image (second optical image) of the substrate 101 by receiving the light flux 19-2 transmitted through or reflected on another visual field region (second region) of the substrate 101 at the same timing as light reception timing of the imaging sensor 105. In the example of FIG. 1, the imaging sensor 205 captures a transmission inspection image (second optical image) of the substrate 101 by receiving the light flux 19-2 transmitted through the transmission illumination visual field region of the substrate 101.

An image of the pattern formed on the imaging sensor 105 is photoelectrically converted by each photosensor element of the imaging sensor 105, and further subjected to analog/digital (A/D) conversion by the sensor circuit 106. In addition, data of a pixel value of the inspection stripe 20 to be measured is stored in the stripe pattern memory 123. The measurement data (pixel data) is, for example, 8-bit unsigned data, and expresses the gray scale level (light amount) of the brightness of each pixel. The stripe data is output to the comparison circuit 108*a* together with the position information measured by the position circuit 107.

An image of the pattern formed on the imaging sensor 205 is photoelectrically converted by each photosensor element of the imaging sensor 205, and further subjected to analog/digital (A/D) conversion by the sensor circuit 206. In addition, data of a pixel value of the inspection stripe 20 to be measured is stored in the stripe pattern memory 223. The measurement data (pixel data) is, for example, 8-bit unsigned data, and expresses the gray scale level (light amount) of the brightness of each pixel. The stripe data is output to the comparison circuit 108*b* together with the position information measured by the position circuit 107.

When the scan step (S102) is performed, the following autofocus operation is performed at the same time.

Here, the focal position on the substrate 101 side of the objective lens forming the magnifying optical system 104 and the design focal position of the autofocus optical system 180 are set in a conjugate relationship. Therefore, when the height position of the pattern formation surface of the substrate 101 is shifted from the focal position on the substrate 101 side of the objective lens forming the magnifying optical system 104, the focal position of the light flux 19-3 to be the reflected image of the AF image detected by the autofocus optical system 180 is also shifted. In other words, the positional relationship between the focal position of the light flux 19-3 (third light flux) reflected from the AF visual field region and separated by the separation mirror and the focal position of the common detection optical system 172 on the substrate 101 side changes. Therefore, each light amount data (light intensity data) of the light amount at the front focal position and the light amount at the rear focal position for obtaining the deviation amount of the focal position of the light flux 19-3 reflected from the AF visual field region of the substrate 101 for detecting the focal position of the light flux 19-3 is a parameter for detecting the change in the positional relationship (third positional relationship) between the focal position of the light flux 19-3 reflected from the AF visual field region of the substrate 101 and the focal position of the common detection optical system 172 on the substrate 101 side.

In addition, the deviation amount of the height position of the pattern formation surface of the substrate 101 from the focal position of the objective lens forming the magnifying optical system 104 on the substrate 101 side can also be a parameter for detecting the change in the positional relationship (third positional relationship) between the focal position of the light flux 19-3 reflected from the AF visual field region of the substrate 101 and the focal position of the common detection optical system 172 on the substrate 101 side.

The height position of the pattern formation surface of the substrate 101 is detected by the position sensor 134. The light amount at the front focal position is detected by the light amount sensor 185. The light amount at the rear focal position is detected by the light amount sensor 187. Therefore, the confocal sensor including the light amount sensor 185 and the light amount sensor 187 is an example of a detector (third detector) that detects the change in the positional relationship (third positional relationship) between the focal position of the light flux 19-3 reflected from the AF visual field region of the substrate 101 and the focal position of the common detection optical system 172 on the substrate 101 side. In other words, the confocal sensor measures the light amount at the front focal position and the light amount at the rear focal position of the light flux 19-3, and detects the change in the positional relationship between the focal position of the light flux 19-3 and the focal position of the common detection optical system 172 on the substrate 101 side using the light amount at the front focal position and the light amount at the rear focal position of the light flux 19-3. The position sensor 134 is another example of a detector (third detector) that detects the change in the positional relationship (third positional relationship) between the focal position of the light flux 19-3 reflected from the AF visual field region of the substrate 101 and the focal position of the common detection optical system 172 on the substrate 101 side.

In addition, a parameter for detecting a change in a positional relationship (first positional relationship) between the focal position of the light flux 19-1 reflected from the reflection illumination visual field region of the substrate 101 and the imaging sensor 105 is gray scale level data detected by the detector 6 (first detector). A parameter for detecting the change in the positional relationship (second positional relationship) between the focal position of the light flux 19-2 transmitted through the transmission illumination visual field region of the substrate 101 and the imaging sensor 205 is gray scale level data detected by the detector 7 (second detector).

Therefore, each parameter for detecting the change (deviation amount) in the positional relationship is measured (detected), and each deviation amount is calculated from these parameters. Specifically, the following operation is performed.

As the substrate height measurement step (S104), the position sensor 134 measures the height position of the pattern formation surface of the substrate 101. Data of the measured height position (mask surface height position) of the pattern formation surface of the substrate 101 is output to the autofocus control circuit 140 and stored in the storage device 53.

As the common detection optical system deviation amount 1 calculation step (S106), the common detection optical system deviation amount 1 calculator 52 reads the height position data of the pattern formation surface of the substrate 101 from the storage device 53, and calculates the deviation amount (common detection optical system deviation amount 1) from the preset reference height position. The reference height position is set to a focal position on the substrate 101 side of the magnifying optical system 104.

As the light amount measurement step (S114), the light amount at the front focal position of the light flux 19-3 incident on the autofocus optical system 180 is measured by the light amount sensor 185, and the light amount at the rear focal position is measured by the light amount sensor 187. Each light amount data (light intensity data) of the light amount at the front focal position and the light amount at the rear focal position is output to the autofocus control circuit 140 and stored in the storage device 51.

As the common detection optical system deviation amount 2 calculation step (S116), the common detection optical system deviation amount 2 calculator 54 first calculates an autofocus signal for the common detection optical system. An autofocus signal εi for the common detection optical system can be calculated by a sum difference between a light amount Ai at the front focal position and a light amount Bi at the rear focal position. The autofocus signal εi is defined by the following Formula (1). i indicates an index.

$$\varepsilon i = (Ai - Bi)/(Ai + Bi) \tag{1}$$

Next, the common detection optical system deviation amount 2 calculator 54 calculates, as the common detection optical system deviation amount 2, a movement amount (deviation amount) of the height position of the pattern formation surface of the substrate 101 for causing the calculated autofocus signal εi to be zero.

As the gray scale level measurement step (S124), the detector 6 detects data of each gray scale level value by receiving the light flux 19-1 reflected from the reflection illumination visual field region of the substrate 101 by each of the detection elements 3*a*, 3*b*, and 3*c* of the imaging sensor 105. Each detected gray scale level data (detection optical system 1 data) is output to the autofocus control circuit 140 via the comparison circuit 108*a* and stored in the storage device 61.

As the detection optical system 1 deviation amount calculation step (S126), the detection optical system 1 deviation amount calculator 62 calculates the deviation amount between the focal position of the light flux 19-1 reflected from the reflection illumination visual field region of the substrate 101 and the detection surface of the imaging sensor 105 as the detection optical system 1 deviation amount.

As the gray scale level measurement step (S134), the detector 7 detects data of each gray scale level value by receiving the light flux 19-2 transmitted through the transmission illumination visual field region of the substrate 101 by each of the detection elements 3*a*, 3*b*, and 3*c* of the imaging sensor 205. Each detected gray scale level data (detection optical system 2 data) is output to the autofocus control circuit 140 via the comparison circuit 108*b* and stored in the storage device 65.

As the detection optical system 2 deviation amount calculation step (S136), the detection optical system 2 deviation amount calculator 66 calculates the deviation amount between the focal position of the light flux 19-2 transmitted through the transmission illumination visual field region of the substrate 101 and the detection surface of the imaging sensor 205 as the detection optical system 2 deviation amount.

As the maximum deviation amount determination step (S140), the determiner 58 determines the maximum deviation amount where the deviation amount is the maximized among the common detection optical system deviation amount 1, the common detection optical system deviation amount 2, the detection optical system 1 deviation amount, and the detection optical system 2 deviation amount. When the maximum deviation amount is the common detection optical system deviation amount 1 or the common detection optical system deviation amount 2, the process proceeds to the common detection optical system adjustment step (S150). When the maximum deviation amount is the detection optical system 1 deviation amount, the process proceeds to the detection optical system 1 adjustment step (S160). When the maximum deviation amount is the detection optical system 2 deviation amount, the process proceeds to the detection optical system 2 adjustment step (S170).

When the common detection optical system deviation amount 1 or the common detection optical system deviation amount 2 is the maximum deviation amount, the following operation is performed.

As the common detection optical system adjustment step (S150), the autofocus mechanism 131 (third adjustment mechanism) automatically adjusts the positional relationship between the focal position of the light flux 19-3 and the focal position of the common detection optical system 172 on the substrate 101 side. The autofocus mechanism 131 moves the substrate 101 or the objective lens forming the magnifying optical system 104 to adjust the positional relationship between the height position of the pattern formation surface of the substrate 101 and the objective lens so that the light flux 19-3 is focused at the design focal position. In the example of FIG. 1, for example, the common detection optical system autofocus processor 56 drives the Z drive mechanism 132 so that the autofocus signal $\varepsilon i$ becomes zero, and moves the height position of the XYθ table 102. As a result, the height position of the pattern formation surface of the substrate 101 placed on the XYθ table 102 is matched with the focal position of the common detection optical system 172 on the substrate 101 side. Therefore, the positional relationship between the focal position of the light flux 19-3 and the focal position of the common detection optical system 172 on the substrate 101 side can be set to the conjugate positional relationship.

As the gray scale level measurement step (S151), the detector 6 detects data of each gray scale level value adjusted by the common detection optical system 172 by receiving the light flux 19-1 reflected from the reflection illumination visual field region of the substrate 101 by each of the detection elements 3*a*, 3*b*, and 3*c* of the imaging sensor 105.

As the gray scale level measurement step (S152), the detector 7 detects data of each gray scale level value adjusted by the common detection optical system 172 by receiving the light flux 19-2 transmitted through the transmission illumination visual field region of the substrate 101 by each of the detection elements 3*a*, 3*b*, and 3*c* of the imaging sensor 205.

As the detection optical system 1 deviation amount calculation step (S153), the detection optical system 1 deviation amount calculator 62 calculates the deviation amount between the focal position of the light flux 19-1 reflected from the reflection illumination visual field region of the substrate 101 and the detection surface of the imaging sensor 105 after the adjustment by the common detection optical system 172 as the detection optical system 1 deviation amount.

As the detection optical system 2 deviation amount calculation step (S154), the detection optical system 2 deviation amount calculator 66 calculates the deviation amount between the focal position of the light flux 19-2 transmitted through the transmission illumination visual field region of the substrate 101 and the detection surface of the imaging sensor 205 after the adjustment by the common detection optical system 172 as the detection optical system 2 deviation amount.

As the detection optical system 1 adjustment step (S155), the detection optical system 1 autofocus processor 64 controls the drive mechanism 135, and the drive mechanism 135 automatically adjusts the positional relationship between the focal position of the light flux 19-1 and the imaging sensor 105. The drive mechanism 135 moves at least one of the collimator lens 178, the image forming lens 179, and the imaging sensor 105 to align the focal position of the light flux 19-1 and the detection surface of the imaging sensor 105. In the examples of FIGS. 1 and 2, for example, by moving the collimator lens 178 in the optical axis direction by the drive mechanism 135, the focal position of the light flux 19-1 and the detection surface of the imaging sensor 105 are aligned. As a result, the detection optical system 176 forms an image of the separated light flux 19-1 on the imaging sensor 105.

As the detection optical system 2 adjustment step (S156), the detection optical system 2 autofocus processor 68 controls the drive mechanism 235, and the drive mechanism 235 automatically adjusts the positional relationship between the focal position of the light flux 19-2 and the imaging sensor 205. The drive mechanism 235 moves at least one of the collimator lens 278, the image forming lens 279, and the imaging sensor 205 to align the focal position of the light flux 19-2 and the detection surface of the imaging sensor 205. In the example of FIG. 2, for example, by moving the collimator lens 278 in the optical axis direction by the drive mechanism 235, the focal position of the light flux 19-2 and the detection surface of the imaging sensor 205 are aligned. As a result, the detection optical system 276 forms an image of the separated light flux 19-2 on the imaging sensor 205.

The height position at which the focal position is adjusted during the scan operation is a tip surface of a film forming the pattern in the region portion having the pattern. In the common detection optical system adjustment step (S150), the movement amount of the height position of the pattern formation surface is detected, but a movement amount error due to nonlinearity of a signal becomes apparent as the movement amount increases. On the other hand, since the position sensor 134 has a difference between the substrate surface and the tip of the film in order to measure the height position of the glass substrate surface, it is not sufficient that the position sensor 134 is directly adjusted to the focusing position. However, the linearity of the movement amount of the height position of the glass substrate measured by the position sensor 134 is sufficiently maintained even if the movement amount increases. Therefore, when the movement amount of the height position of the pattern formation surface increases, the output of the position sensor 134 becomes larger than the output of the common detection optical system adjustment step (S150). As a result, when the deviation amount of the glass substrate surface from the reference height position is the maximum deviation amount among the above-described four deviation amounts, the detection optical system 1 and the detection optical system 2 can be adjusted only finely by first adjusting the common detection optical system 172 and then adjusting the deviation amounts of the detection optical system 1 and the detection optical system 2. The same applies to a case where the deviation amount (common detection optical system deviation amount 2) based on the detection result of the confocal sensor is the maximum deviation amount.

In a case where the detection optical system 1 deviation amount is the maximum deviation amount, the following operation is performed.

As the detection optical system 1 adjustment step (S160), the adjustment in the common detection optical system 172 is not performed, the detection optical system 1 autofocus processor 64 controls the drive mechanism 135, and the drive mechanism 135 automatically adjusts the positional relationship between the focal position of the light flux 19-1 and the imaging sensor 105. The drive mechanism 135 is similar in that it is sufficient that at least one of the collimator lens 178, the image forming lens 179, and the imaging sensor 105 is moved. In the examples of FIGS. 1 and 2, for example, by moving the collimator lens 178 in the optical axis direction by the drive mechanism 135, the focal position of the light flux 19-1 and the detection surface of the imaging sensor 105 are aligned. As a result, the detection optical system 176 forms an image of the separated light flux 19-1 on the imaging sensor 105.

As the detection optical system 2 adjustment step (S162), the adjustment in the common detection optical system 172 is not performed, the detection optical system 2 autofocus processor 68 controls the drive mechanism 235, and the drive mechanism 235 automatically adjusts the positional relationship between the focal position of the light flux 19-2 and the imaging sensor 205. The drive mechanism 235 is similar in that it is sufficient that at least one of the collimator lens 278, the image forming lens 279, and the imaging sensor 205 is moved. In the example of FIG. 2, for example, by moving the collimator lens 278 in the optical axis direction by the drive mechanism 235, the focal position of the light flux 19-2 and the detection surface of the imaging sensor 205 are aligned. As a result, the detection optical system 276 forms an image of the separated light flux 19-2 on the imaging sensor 205.

In a case where the detection optical system 2 deviation amount is the maximum deviation amount, the following operation is performed.

As the detection optical system 2 adjustment step (S170), the adjustment in the common detection optical system 172 is not performed, the detection optical system 2 autofocus processor 68 controls the drive mechanism 235, and the drive mechanism 235 automatically adjusts the positional relationship between the focal position of the light flux 19-2 and the imaging sensor 205. The drive mechanism 235 is similar in that it is sufficient that at least one of the collimator lens 278, the image forming lens 279, and the imaging sensor 205 is moved. In the example of FIG. 2, for example, by moving the collimator lens 278 in the optical axis direction by the drive mechanism 235, the focal position of the light flux 19-2 and the detection surface of the imaging sensor 205 are aligned. As a result, the detection optical system 276 forms an image of the separated light flux 19-2 on the imaging sensor 205.

As the detection optical system 1 adjustment step (S172), the adjustment in the common detection optical system 172 is not performed, the detection optical system 1 autofocus processor 64 controls the drive mechanism 135, and the drive mechanism 135 automatically adjusts the positional relationship between the focal position of the light flux 19-1 and the imaging sensor 105. The drive mechanism 135 is similar in that it is sufficient that at least one of the collimator lens 178, the image forming lens 179, and the imaging sensor 105 is moved. In the examples of FIGS. 1 and 2, for example, by moving the collimator lens 178 in the optical axis direction by the drive mechanism 135, the focal position of the light flux 19-1 and the detection surface of the imaging sensor 105 are aligned. As a result, the detection optical system 176 forms an image of the separated light flux 19-1 on the imaging sensor 105.

In a case where the detection optical system 1 deviation amount or the detection optical system 2 deviation amount is the maximum deviation amount, even if the adjustment in the common detection optical system 172 is performed, a large adjustment amount still remains. Therefore, it is possible to avoid or reduce an adjustment delay with respect to the scan operation by individually performing adjustment.

As described above, in the first embodiment, the optical image acquisition mechanism 150 simultaneously captures two different optical images of each of the inspection stripes 20 in a state where the focal point adjustment is performed at least at two locations among the focal point adjustment in the common detection optical system 172, the focal point adjustment in the detection optical system 176, and the focal point adjustment in the detection optical system 276.

As the reference image creation step (S200), the reference image creation circuit 112 creates a reference image to be a reference using the figure pattern data (design data). The reference image is created for each inspection stripe 20 of the inspected substrate 101 in parallel with the scan operation of the inspection stripe 20. Specifically, the following operation is performed. The reference image creation circuit 112 inputs figure pattern data (design data) for each frame region 30 of the target inspection stripe 20, and converts each figure pattern defined in the figure pattern data into binary or multi-valued image data.

In the figure defined in the figure pattern data, for example, a rectangle or a triangle is used as a basic figure. For example, figure data in which a form, a size, a position, and the like of each pattern figure are defined by information such as the coordinates (x, y) at a reference position of the figure, a length of a side, and a figure code to be an identifier to distinguish a figure type such as the rectangle or the triangle is stored.

If the design pattern data to be the figure data is input to the reference image creation circuit 112, the data is expanded into data of each figure and a figure code illustrating the figure shape of the figure data, a figure dimension, and the like are interpreted. In addition, the data is expanded into binary or multi-valued design pattern image data as a pattern disposed in a square with a grid of a predetermined quantization dimension as a unit and is output. In other words, the design data is read, an occupancy rate occupied by the figure in the design pattern is calculated for each square formed by virtually dividing the frame region as a square with a predetermined dimension as a unit, and n-bit occupancy rate data (design image data) is output. For example, it is preferable to set one square as one pixel. Assuming that one pixel has a resolution of $1/2^8$ ($=1/256$), a small region of $1/256$ is allocated by the region of the figure disposed in the pixel to calculate the occupancy rate in the pixel. In addition, it is created as 8-bit occupancy rate data. The square (inspection pixel) may be matched with the pixel of the measurement data.

Next, the reference image creation circuit 112 performs filter processing on the design image data of the design pattern to be image data of the figure, using a filter function.

Figure 12:
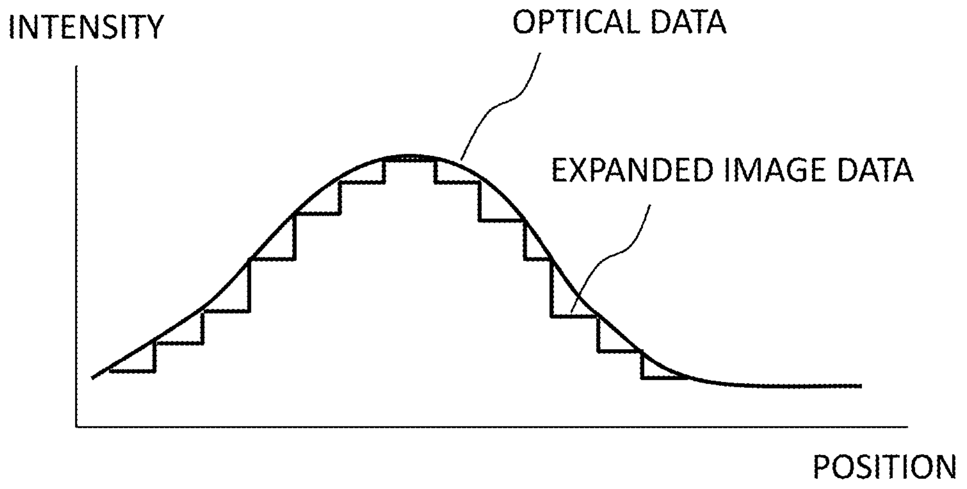
FIG. 12 is a diagram for describing filter processing in the first embodiment.
Figure 13:
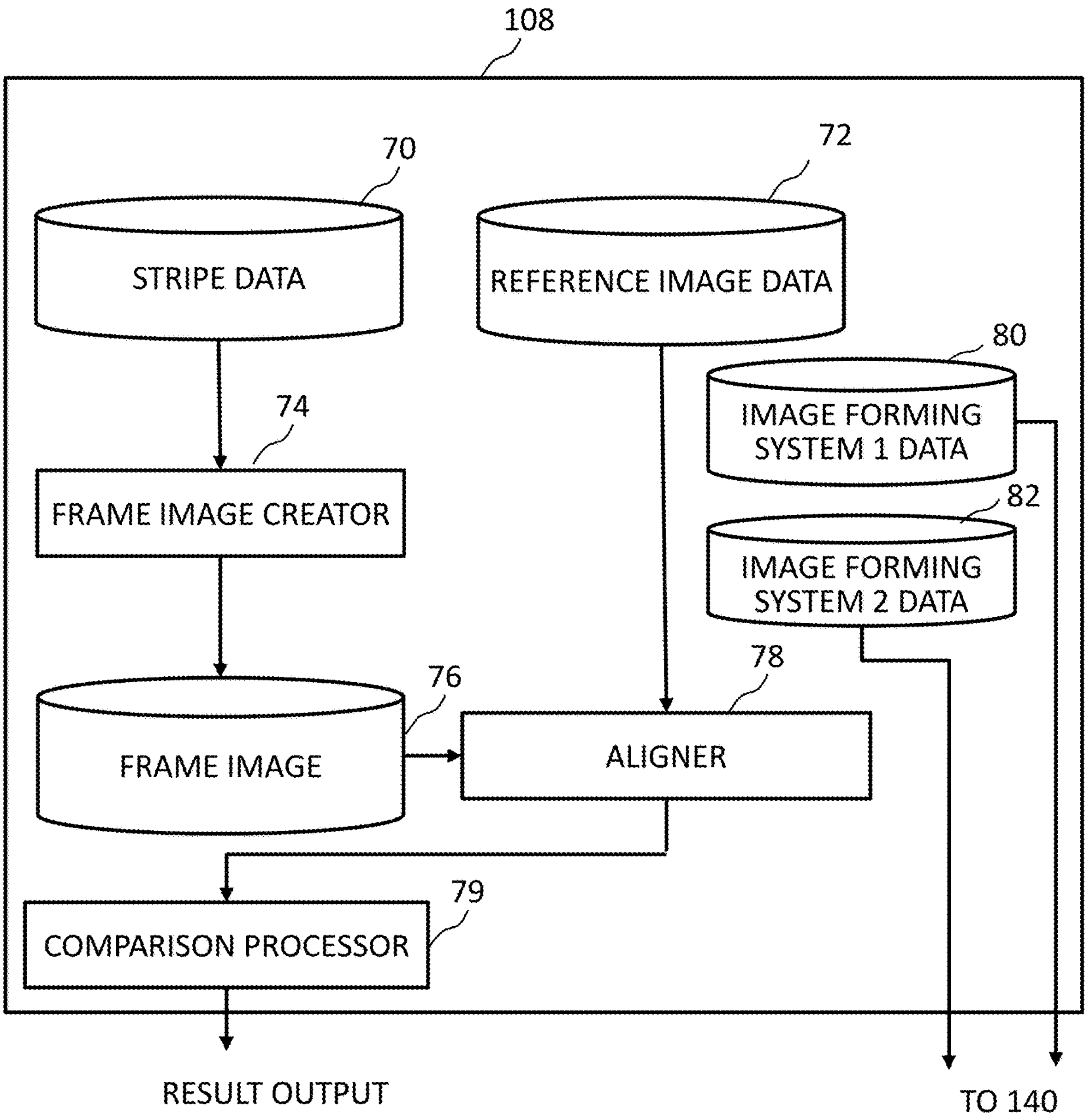
FIG. 13 is a diagram illustrating an example of an internal configuration of a comparison circuit in the first embodiment.

FIG. 12 is a diagram for describing filter processing in the first embodiment. The pixel data of the optical image captured from the inspected substrate 101 is in a state in which a filter acts due to resolution characteristics of an optical system used for imaging or the like, in other words, in an analog state that continuously changes. Therefore, for example, as illustrated in FIG. 13, the image intensity (gray value) is different from that of an expanded image (design image) having a digital value. On the other hand, since the figure pattern data is defined by the figure code or the like as described above, the image intensity (gray value) may be a digital value in the expanded design image. Therefore, the reference image creation circuit 112 performs image processing (filter processing) on the expanded image to create a reference image close to the optical image. As a result, design image data that is image data on the design side in which the image intensity (gray value) is a digital value can be matched with image generation characteristics of the measurement data (optical image). The created reference image is output to the comparison circuits 108*a* and 108*b*.

FIG. 13 is a diagram illustrating an example of an internal configuration of a comparison circuit in the first embodiment. In FIG. 13, storage devices 70, 72, and 76 such as magnetic disk drives, a frame image creator 74, an aligner 78, and a comparison processor 79 are arranged in the comparison circuit 108 (108*a* and 108*b*). A series of "units" such as the frame image creator 74, the aligner 78, and the comparison processor 79 includes a processing circuit. The processing circuit includes an electric circuit, a computer, a processor, a circuit board, a quantum circuit, or a semiconductor device. Further, a common processing circuit (same processing circuit) may be used for each "unit". Alternatively, a different processing circuit (separate processing circuit) may be used. Input data necessary for the frame image creator 74, the aligner 78, and the comparison processor 79 or a calculated result is stored in a memory (not illustrated) or the memory 111 in the comparison circuit 108 each time.

The stripe data (stripe region image) for reflection inspection input to the comparison circuit 108*a* is stored in the storage device 70. The reference image data input to the comparison circuit 108*a* is stored in the storage device 72.

The stripe data (stripe region image) for transmission inspection input to the comparison circuit 108*b* is stored in the storage device 70. The reference image data input to the comparison circuit 108*b* is stored in the storage device 72.

The comparison step (S300) and the comparison circuit 108*a* (an example of the comparator) compare the captured optical image with the reference image using the reference image and output a result. Similarly, the comparison circuit 108*b* (an example of the comparator) compares the captured optical image with the reference image using the reference image, and outputs a result. The comparison processing for transmission inspection and the comparison processing for reflection inspection have the same content. Specifically, the following operation is performed.

In the comparison circuit 108 (108*a* and 108*b*), first, the frame image creator 74 generates a plurality of frame images 31 obtained by dividing the stripe region image (optical image) by a predetermined width. Specifically, as illustrated in FIG. 2, the stripe region image is divided into frame images of a plurality of rectangular frame regions 30. For example, the image is divided into a size of 512×512 pixels. The data of each frame region 30 is stored in the storage device 76.

Next, the aligner 78 reads the corresponding frame image 31 and the corresponding reference image from the storage devices 72 and 76 for each frame region 30, and aligns the frame image 31 and the corresponding reference image by a predetermined algorithm. For example, the alignment is performed using a least squares method.

In addition, the comparison processor 79 (another example of the comparator) compares the frame image 31 with the reference image corresponding to the frame image 31. For example, comparison is performed for each pixel. Here, both the images are compared for each pixel according to a predetermined determination condition to determine the presence or absence of a defect such as a shape defect. As the determination condition, for example, both the images are compared for each pixel according to a predetermined algorithm to determine the presence or absence of a defect. For example, a difference value between pixel values of both the images is calculated for each pixel, and a case where the difference value is larger than a threshold Th is determined as a defect. In addition, a comparison result may be output to, for example, the magnetic disk drive 109, the magnetic tape device 115, the flexible disk device (FD) 116, the CRT 117, and the pattern monitor 118, or may be output from the printer 119.

In the above-described example, the case of die to database inspection has been described, but die to die inspection may be used. In such a case, the comparison circuit 108 (108*a* and 108*b*) uses the frame image (optical image) of the die 2 acquired for one region of the frame regions as a reference (reference image) for the frame regions in which the die to die inspection is performed among the plurality of frame regions 30. First, the aligner 78 reads the frame image 31 of the corresponding die 1 and the frame image of the die 2 from the storage device 76 for each frame region 30 in which the die to die inspection is performed, and aligns the frame image 31 of the die 1 and the frame image of the die 2 by a predetermined algorithm. For example, the alignment is performed using a least squares method. In addition, the comparison processor 79 (comparator) compares the frame image 31 of the corresponding die 1 with the frame image of the die 2 for each pixel for each frame region 30 in which the die to die inspection is performed.

As described above, according to the first embodiment, even when a plurality of inspection images are simultaneously captured by different imaging sensors, the focal points of the light fluxes 19-1 and 19-2 of the detection optical systems 176 and 276 can be focused on the respective imaging sensors.

Second Embodiment

In the first embodiment, a configuration in which reflection inspection and transmission inspection are simultaneously performed has been described, but the present disclosure is not limited thereto. In a second embodiment, a configuration in which two different reflection inspections are simultaneously performed will be described. Contents other than points specifically described below are the same as those in the first embodiment.

Figure 14:
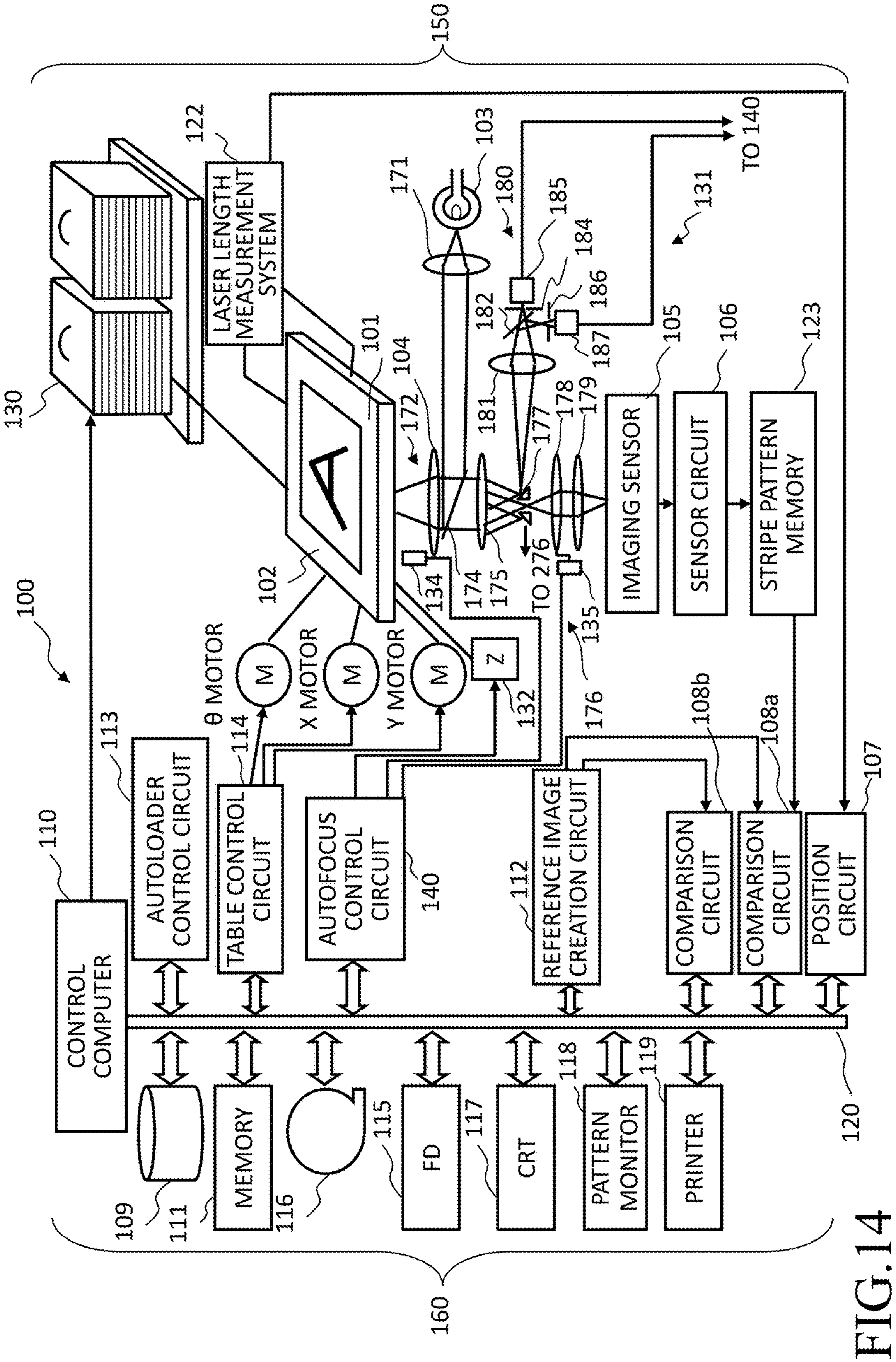
FIG. 14 is a configuration diagram illustrating an example of a configuration of a pattern inspection apparatus in a second embodiment.

FIG. 14 is a configuration diagram illustrating an example of a configuration of a pattern inspection apparatus in the second embodiment.

Figure 15:
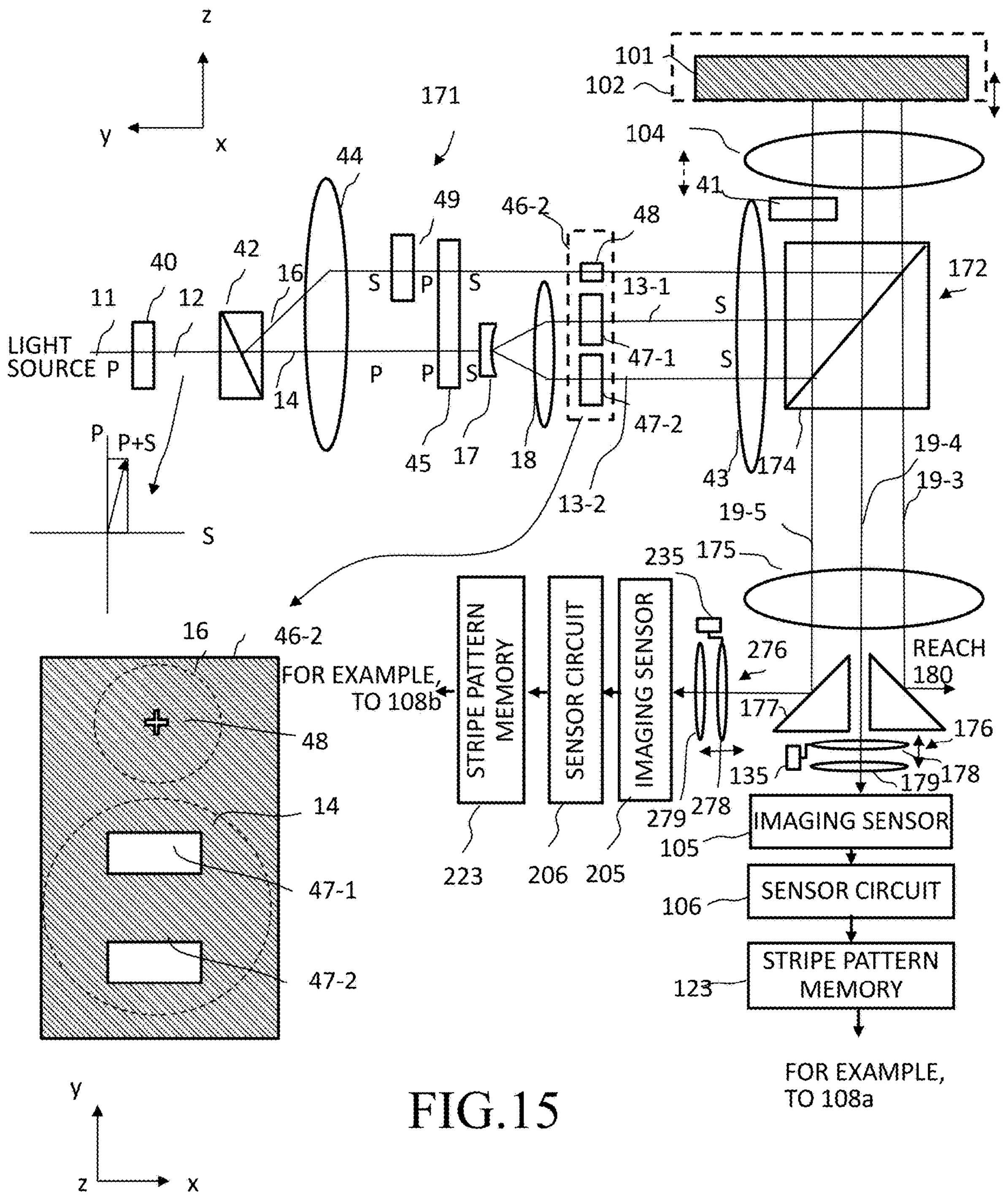
FIG. 15 is a configuration diagram illustrating an example of a configuration of a reflection illumination optical system and an example of a detection optical system in the second embodiment.

FIG. 15 is a configuration diagram illustrating an example of a configuration of a reflection illumination optical system and an example of a detection optical system in the second embodiment.

FIGS. 14 and 15 are the same as FIGS. 1 and 2 except that there is no transmission illumination optical system 170 and that a concave lens 17, a convex lens 18, a slit plate 46-2, and a ½ wavelength plate 41 are added instead of a slit plate 46-1 in a reflection illumination optical system 171.

For example, in an inspection apparatus for an EUV mask, a substrate 101 is illuminated in a plurality of different polarization states, and a reflection inspection image for each polarization state is simultaneously acquired. An inspection apparatus 100 in the second embodiment can be used, for example, for simultaneous inspection using a reflection inspection image for each polarization state.

The reflection illumination optical system 171 includes a ½ wavelength plate 40, a Rochon prism 42, a collimator lens 44, a ½ wavelength plate 49, a ½ wavelength plate 45, a concave lens 17, a convex lens 18, a slit plate 46-2, a ½ wavelength plate 41, and a lens 43.

In the example of FIG. 15, a polarization direction (electric field vibration direction) of light 11 incident on the reflection illumination optical system 171 is adjusted in a certain direction by an optical element (not illustrated). For example, the light 11 (P wave) having a polarization direction of, for example, 90 degrees from an x axis with respect to a plane (xz plane) orthogonal to a traveling direction of the light 11 is incident on the reflection illumination optical system 171.

The polarization direction of the light 11 (first light) incident on the ½ wavelength plate 40 is changed by adjusting an angle of the ½ wavelength plate 40. At that time, as illustrated in FIG. 2, the angle is adjusted so that, for example, a P wave component for inspection light is increased and, for example, an S wave component for measurement light for the autofocus is decreased. The light 12 including, for example, the P wave component and the S wave component output from the ½ wavelength plate 40 is incident on the Rochon prism 42, and separates, for example, the trajectory of the P wave component and the trajectory of the S wave component. For example, the P wave component is output while being straight, and the S wave component is output obliquely. As a result, the light can be separated into the inspection light 14 and the measurement light 16. Both the inspection light 14 and the measurement light 16 are incident on the collimator lens 44, and are refracted so as to have trajectories parallel to each other. For example, the inspection light 14 passes through the center of the collimator lens 44 and is output in a going-straight direction. The measurement light 16 passes through an outer peripheral portion of the collimator lens 44, is refracted in a converging direction, and is output in a direction parallel to the inspection light 14.

A polarization direction of the inspection light 14 having passed through the collimator lens 44 is a polarization direction of P waves, for example, whereas a polarization direction of the measurement light 16 having passed through the collimator lens 44 is a polarization direction of S waves, for example. Therefore, the measurement light 16 is incident on the ½ wavelength plate 49, is converted into light (for example, P waves) having the same polarization direction as that of the inspection light 14, and is output. Both the inspection light 14 and the measurement light 16 are incident on the ½ wavelength plate 45, and are converted into S waves, for example.

The inspection light 14 having passed through the ½ wavelength plate 45 spreads in a diverging direction by the concave lens 17, becomes parallel light in a spread state by the convex lens 18, and is incident on the slit plate 46-2 in parallel with the measurement light 16.

In the slit plate 46-2, for example, two rectangular slit openings 47-1 and 47-2 for forming two reflection visual fields for reflection inspection are formed. In addition, in the slit plate 46-2, a slit opening 48 that limits the passage of measurement light (light for autofocus) for measuring a height position deviation amount of the substrate 101 from the focal height is formed. A shape of the slit opening 48 is similar to that of the first embodiment. The spread inspection light 14 is emitted so as to include the entire two slit openings 47-1 and 47-2. Similarly, the measurement light 16 is emitted so as to include the entire slit opening 48. Inspection light 13-1 of a first reflection visual field slit image that has passed through the slit opening 47-1 is incident on a beam splitter 174 through the lens 43 in the polarization direction of the S waves, for example. Inspection light 13-2 of a second reflection visual field slit image that has passed through the slit opening 47-2 is incident on the beam splitter 174 through the lens 43 in the polarization direction of the S waves, for example. In addition, the measurement light 16 of the autofocus slit image (AF slit image) that has passed through the slit opening 48 is incident on the beam splitter 174 through the lens 43 in the polarization direction of the S waves, for example.

Among the inspection light 13-1, the inspection light 13-2, and the measurement light 16 reflected by the beam splitter 174, the inspection light 13-2 is incident on the ½ wavelength plate 41, converted into light in a polarization direction different from that of the inspection light 13-1, and output.

Hereinafter, the reflection visual field region of FIG. 4 will be described as a first reflection illumination visual field region, and the transmission visual field will be described as a second reflection illumination visual field region.

The reflection illumination optical system 171 illuminates an autofocus illumination visual field region (third region) of the substrate 101 with the measurement light 16 having passed through the slit plate 46-2. The reflection illumination optical system 171 further illuminates the first reflection illumination visual field region (another example of the first region) of the substrate 101 with the inspection light 13-1. The reflection illumination optical system 171 further illuminates the second reflection illumination visual field region (another example of the second region) of the substrate 101 with the inspection light 13-2 having a polarization direction different from that of the inspection light 13-1. Specifically, the inspection light 13-1, the inspection light 13-2, and the measurement light 16 incident on the beam splitter 174 are reflected by the beam splitter 174, and are emitted to the substrate 101 by a magnifying optical system 104. In other words, the common detection optical system 172 illuminates a focus visual field region of the inspected substrate 101 with the measurement light 16 for focus adjustment.

Since images of the inspection light 13-1, the inspection light 13-2, and the measurement light 16 are formed by the same lens, the focal height position of the inspection light 13-1, the focal height position of the inspection light 13-2, and the focal height position of the measurement light 16 are the same. As described above, in the reflection inspection, the beam splitter 174 and the magnifying optical system 104 function as a part of the reflection illumination optical system 171.

A light flux 19-4 (another example of the first light flux) reflected by the first reflection illumination visual field region (another example of the first region) of the substrate 101, a light flux 19-5 (another example of the second light flux) transmitted through the second reflection illumination visual field region (another example of the second region) of the substrate 101, and a light flux 19-3 (third light flux) reflected by the autofocus illumination visual field region (an example of the third region) of the substrate 101 are guided together to a common detection optical path by the common detection optical system 172.

Specifically, the light flux 19-4 reflected by the first reflection illumination visual field region of the substrate 101, the light flux 19-5 transmitted through the second reflection illumination visual field region of the substrate 101, and the light flux 19-3 reflected by the autofocus illumination visual field region of the substrate 101 all pass through the magnifying optical system 104, the beam splitter 174, and the image forming lens 175, which are the common detection optical system 172, and travel to the separation mirror 177. The image forming lens 175 forms images of the three light fluxes 19-4, 19-5, and 19-3 on the reflection surface of the separation mirror 177. At this time, the light flux 19-5 is incident on the ½ wavelength plate 41, is converted into light having the same polarization direction as that of the light flux 19-4, and is then incident on the beam splitter 174. As a result, the light flux 19-5 can pass through the beam splitter 174 together with the light flux 19-4.

The separation mirror 177 (an example of a light flux separation mechanism) separates the light flux 19-4 reflected by the first reflection illumination visual field region of the substrate 101, the light flux 19-5 transmitted through the second reflection illumination visual field region of the substrate 101, and the light flux 19-3 reflected by the autofocus illumination visual field region of the substrate 101. Specifically, the light flux 19-4 reflected by the first reflection illumination visual field region of the substrate 101 passes through, for example, the separation mirror 177 and travels to the detection optical system 176. The light flux 19-5 transmitted through the second reflection illumination visual field region of the substrate 101 is reflected by the separation mirror 177, for example, and travels to the detection optical system 276. The light flux 19-3 reflected by the autofocus illumination visual field region of the substrate 101 is reflected by the separation mirror 177 and travels to the autofocus optical system 180.

An image of the separated light flux 19-4 incident on the detection optical system 176 is formed on the imaging sensor 105 (first sensor) by the detection optical system 176 (first detection optical system). Specifically, the light flux 19-4 incident on the detection optical system 176 is incident on the detection optical system 176 while spreading in the diverging direction, is refracted by the collimator lens 178, becomes parallel light, and travels to the image forming lens 179. Then, the image forming lens 179 refracts the light flux 19-4 in the converging direction to form an image on the detection surface of the imaging sensor 105. The imaging sensor 105 captures an optical image (first optical image) of the inspected substrate 101 by receiving the light flux 19-4 reflected on, for example, the first reflection illumination visual field region (first region) of the inspected substrate 101.

An image of the separated light flux 19-5 incident on the detection optical system 276 is formed on the imaging sensor 205 (second sensor) by the detection optical system 276 (second detection optical system). Specifically, the light flux 19-5 incident on the detection optical system 276 is incident on the detection optical system 276 while spreading in the diverging direction, is refracted by the collimator lens 278, becomes parallel light, and travels to the image forming lens 279. Then, the image forming lens 279 refracts the light flux 19-5 in the converging direction to form an image on the detection surface of the imaging sensor 205. The imaging sensor 205 captures an optical image (second optical image) of the inspected substrate 101 by receiving the light flux 19-5 reflected on, for example, the second reflection illumination visual field region (second region) of the inspected substrate 101 at the same timing as the light reception timing of the imaging sensor 105.

The second embodiment is similar to the first embodiment except that the "reflection illumination visual field region" is replaced with the "first reflection illumination visual field region", the "transmission illumination visual field region" is replaced with the "second reflection illumination visual field region", the "transmission" is replaced with the "reflection", the "reflection inspection" is replaced with the "first reflection inspection", the "transmission inspection" is replaced with the "second reflection inspection", the "light flux 19-1" is replaced with the "light flux 19-4", and the "light flux 19-2" is replaced with the "light flux 19-5".

As described above, according to the second embodiment, even in a case where illumination light of a plurality of different polarization states are illuminated by the same illumination method, it is possible to capture an optical image obtained from each polarization state in a focused state.

The embodiments have been described with reference to the specific examples. However, the present disclosure is not limited to these specific examples.

Further, descriptions of parts and the like that are not directly necessary for explanation of the present disclosure, such as an apparatus configuration and a control method, have been omitted. However, the necessary apparatus configuration and control method can be appropriately selected and used. For example, although the description of the controller configuration for controlling the inspection apparatus 100 is omitted, it goes without saying that the necessary controller configuration is appropriately selected and used.

Further, all pattern inspection apparatuses and pattern inspection methods including the elements of the present disclosure and capable of being appropriately designed and changed by those skilled in the art are included in the scope of the present disclosure.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:

a stage on which a substrate on which a figure pattern is formed is placed;

a first sensor configured to capture a first optical image of the substrate by receiving a first light flux transmitted through or reflected on a first region of the substrate;

a second sensor configured to capture a second optical image of the substrate by receiving a second light flux transmitted through or reflected on a second region of the substrate at a same timing as light reception timing of the first sensor;

a common detection optical system configured to illuminate a third region of the substrate with light for focus adjustment and guide the first light flux, the second light flux, and a third light flux reflected on the third region of the substrate to a common optical path of a detection system;

a light flux separation mechanism configured to separate the first light flux, the second light flux, and the third light flux;

a first detection optical system configured to form an image of a separated first light flux on the first sensor;

a second detection optical system configured to form an image of a separated second light flux on the second sensor;

a first detection mechanism configured to detect a change in a first positional relationship between a focal position of the first light flux and the first sensor;

a second detection mechanism configured to detect a change in a second positional relationship between a focal position of the second light flux and the second sensor;

a third detection mechanism configured to detect a change in a third positional relationship between a focal position of a separated third light flux and a focal position of the common detection optical system on the substrate side;

a first adjustment mechanism configured to automatically adjust the first positional relationship;

a second adjustment mechanism configured to automatically adjust the second positional relationship;

a third adjustment mechanism configured to automatically adjust the third positional relationship; and a control circuit configured to control at least two of the first adjustment mechanism, the second adjustment mechanism, and the third adjustment mechanism so as to adjust at least two of the first positional relationship, the second positional relationship, and the third positional relationship based on the change in the first positional relationship, the change in the second positional relationship, and the change in the third positional relationship.

2. The apparatus according to claim 1, wherein the light flux separation mechanism includes one of a fixed mirror and a time division mirror.

3. The apparatus according to claim 1, wherein the third detection mechanism includes a confocal sensor that receives the third light flux.

4. The apparatus according to claim 1, wherein the first sensor includes a plurality of first detection elements, the second sensor includes a plurality of second detection elements, the first detection mechanism is configured using a part of the plurality of first detection elements, and the second detection mechanism is configured using a part of the plurality of second detection elements.

5. The apparatus according to claim 1, wherein the first sensor includes a plurality of first detection elements, and at least one of a part of the plurality of first detection elements is disposed at a height position in an optical axis direction different from those of the others of the plurality of first detection elements, the second sensor includes a plurality of second detection elements, and at least one of a part of the plurality of second detection elements is disposed at a height position in the optical axis direction different from those of the others of the plurality of second detection elements, the first detection mechanism is configured using the part of the plurality of first detection elements having different height positions in the optical axis direction, and the second detection mechanism is configured using the part of the plurality of second detection elements having different height positions in the optical axis direction.

6. The apparatus according to claim 1, wherein the common detection optical system includes an objective lens, and the third adjustment mechanism moves the substrate or the objective lens to adjust a positional relationship between a height position of a pattern formation surface of the substrate and the objective lens such that the third light flux is focused at a design focal position.

7. The apparatus according to claim 1, wherein the first detection optical system includes a first collimator lens and a first image forming lens, and the first adjustment mechanism moves at least one of the first collimator lens, the first image forming lens, and the first sensor to align a focal position of the first light flux with a detection surface of the first sensor.

8. The apparatus according to claim 7, wherein the second detection optical system includes a second collimator lens and a second image forming lens, and the second adjustment mechanism moves at least one of the second collimator lens, the second image forming lens, and the second sensor to align a focal position of the second light flux with a detection surface of the second sensor.

9. The apparatus according to claim 1, wherein the control circuit determines a positional relationship in which a change amount is maximized among the change in the first positional relationship, the change in the second positional relationship, and the change in the third positional relationship, and the control circuit controls at least two of the first adjustment mechanism, the second adjustment mechanism, and the third adjustment mechanism so as to first adjust the positional relationship in which the change amount is maximized.

10. The apparatus according to claim 1, further comprising an illumination slit plate configured to form a first illumination slit image and a second illumination slit image that illuminate the first region and the second region of the substrate, wherein the first sensor receives the first light flux reflected on the first region of the substrate, and the second sensor receives the second light flux reflected on the second region of the substrate.

11. The apparatus according to claim 4, wherein the first detection mechanism detects the change in the first positional relationship using data detected by receiving a part of the first light flux by the part of the plurality of first detection elements, and the second detection mechanism detects the change in the second positional relationship using data detected by receiving a part of the second light flux by the part of the plurality of second detection elements.

12. The apparatus according to claim 3, wherein the confocal sensor measures a light amount at a front focal position and a light amount at a rear focal position of the third light flux, and detects the change in the third positional relationship using the light amount at the front focal position and the light amount at the rear focal position of the third light flux.

13. The apparatus according to claim 1, wherein the third detection mechanism includes a position sensor that detects a height position of a pattern formation surface of the substrate.

14. A pattern inspection method comprising:

capturing, with a first sensor, a first optical image of a substrate which is placed on a stage and on which a figure pattern is formed by receiving a first light flux transmitted through or reflected on a first region of the substrate;

capturing, with a second sensor, a second optical image of the substrate by receiving a second light flux transmitted through or reflected on a second region of the substrate at a same timing as light reception timing of the first sensor;

illuminating, with a common detection optical system, a third region of the substrate with light for focus adjustment and guiding, with the common detection optical system, the first light flux, the second light flux, and a third light flux reflected on the third region of the substrate to a common detection optical path;

separating the first light flux, the second light flux, and the third light flux;

forming, with a first detection optical system, an image of a separated first light flux on the first sensor;

forming, with a second detection optical system, an image of a separated second light flux on the second sensor;

detecting a change in a first positional relationship between a focal position of the first light flux and the first sensor;

detecting a change in a second positional relationship between a focal position of the second light flux and the second sensor;

detecting a change in a third positional relationship between a focal position of a separated third light flux and a focal position of the common detection optical system on the substrate side; and controlling at least two of a first adjustment mechanism automatically adjusting the first positional relationship, a second adjustment mechanism automatically adjusting the second positional relationship, and a third adjustment mechanism automatically adjusting the third positional relationship so as to adjust at least two of the first positional relationship, the second positional relationship, and the third positional relationship based on the change in the first positional relationship, the change in the second positional relationship, and the change in the third positional relationship.

* * * * *